(12) United States Patent
Park et al.

(10) Patent No.: US 10,571,766 B2
(45) Date of Patent: Feb. 25, 2020

(54) DISPLAY PANEL AND DISPLAY DEVICE INCLUDING THE SAME

(71) Applicant: Samsung Display Co., Ltd., Yongin-Si, Gyeonggi-Do (KR)

(72) Inventors: Doyeong Park, Hwaseong-si (KR); Seongyoung Lee, Hwaseong-si (KR); Seulbee Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/129,548

(22) Filed: Sep. 12, 2018

(65) Prior Publication Data

US 2019/0146290 A1 May 16, 2019

(30) Foreign Application Priority Data

Nov. 15, 2017 (KR) .......................... 10-2017-0152593

(51) Int. Cl.
*G06F 3/038* (2013.01)
*G09G 5/00* (2006.01)
(Continued)

(52) U.S. Cl.
CPC ...... *G02F 1/136209* (2013.01); *G02F 1/1368* (2013.01); *G02F 1/133345* (2013.01); *G02F 1/133528* (2013.01); *G02F 1/133617* (2013.01); *G02F 1/134309* (2013.01); *G02F 1/136227* (2013.01); *G09G 3/3674* (2013.01);
(Continued)

(58) Field of Classification Search
CPC ......... G02F 1/133345; G02F 1/133528; G02F 1/133617; G02F 1/134309; G02F 1/136209; G02F 1/136227; G02F 1/1368; G02F 2001/133548; G02F 2001/133565;
(Continued)

(56) References Cited

U.S. PATENT DOCUMENTS

2007/0291217 A1* 12/2007 Kang ................. G02F 1/136227
349/156
2015/0198854 A1* 7/2015 Song ................... G09G 3/3648
349/43

(Continued)

FOREIGN PATENT DOCUMENTS

KR 10-2016-0028580 A 3/2016
KR 10-1761209 B 7/2017
KR 10-2018-0133979 A 12/2018

*Primary Examiner* — Insa Sadio
(74) *Attorney, Agent, or Firm* — Innovation Counsel LLP

(57) ABSTRACT

A display panel a first display substrate including a non-display area in which a driving circuit and a light shielding layer are disposed, and a display area in which a pixel electrode connected to the driving circuit is disposed, a second display substrate facing the first display substrate, and a liquid crystal layer disposed between the first display substrate and the second display substrate. The driving circuit includes a first transistor, a second transistor, a first branch electrode connected to the first transistor, a second branch electrode connected to the second transistor and overlapping with the first branch electrode in a direction parallel to a surface of the first display substrate, and a connection electrode connecting the first and second branch electrodes disposed on different layers from each other. The light shielding layer overlaps with the first and second transistors and exposes the first and second branch electrodes.

20 Claims, 13 Drawing Sheets

(51) Int. Cl.
*G02F 1/1362* (2006.01)
*G02F 1/1368* (2006.01)
*G02F 1/1343* (2006.01)
*G02F 1/1335* (2006.01)
*G02F 1/1333* (2006.01)
*G09G 3/36* (2006.01)

(52) U.S. Cl.
CPC .............. *G02F 2001/13629* (2013.01); *G02F 2001/133548* (2013.01); *G02F 2001/133565* (2013.01); *G02F 2001/133614* (2013.01); *G09G 2310/0286* (2013.01)

(58) Field of Classification Search
CPC .......... G02F 2001/133614; G02F 2001/13629; G09G 2310/0286; G09G 3/3674
See application file for complete search history.

(56) References Cited

U.S. PATENT DOCUMENTS

| | | |
|---|---|---|
| 2015/0205154 A1 | 7/2015 | Koo et al. |
| 2016/0035303 A1 | 2/2016 | Kim |
| 2016/0062178 A1 | 3/2016 | Kim et al. |
| 2016/0180787 A1 | 6/2016 | Park et al. |
| 2018/0356677 A1 | 12/2018 | Kim et al. |

\* cited by examiner

DISPLAY PANEL AND DISPLAY DEVICE INCLUDING THE SAME

CROSS-REFERENCE TO RELATED APPLICATION

This application claims priority to Korean Patent Application No. 10-2017-0152593, filed on Nov. 15, 2017, and all the benefits accruing therefrom under 35 U.S.C. § 119, the content of which in its entirety is herein incorporated by reference.

BACKGROUND

1. Field

Embodiments of the invention relate to a display device and, more particularly, to a display panel including a color conversion member including an illuminant and a display device including the display panel.

2. Description of the Related Art

Various display devices used in multimedia devices such as televisions, portable phones, tablet computers, navigation systems and game consoles have been developed. In addition, photo-luminescent liquid crystal display devices increasing light efficiency and improving color balance have been developed.

When display devices are used in an outdoor environment rich in external light, the external light may be reflected and/or scattered at display surfaces of the display devices. A polarizing member including a polarizer and a phase retardation layer combined with the polarizer is used to solve or prevent the deterioration of the display quality.

SUMMARY

Embodiments of the invention may provide a display panel capable of protecting a transistor disposed in a non-display area and a display device including the same.

In an aspect of the invention, a display panel may include a first display substrate including a non-display area in which a driving circuit and a light shielding layer are disposed and a display area in which a pixel electrode connected to the driving circuit is disposed, a second display substrate facing the first display substrate, and a liquid crystal layer disposed between the first display substrate and the second display substrate. The driving circuit may include a first transistor, a second transistor, a first branch electrode connected to the first transistor and disposed on a first layer, a second branch electrode connected to the second transistor and disposed on a second layer, the second branch electrode overlapping with the first branch electrode in a direction parallel to a surface of the first display substrate, and a connection electrode connecting the first and second branch electrodes disposed on different layers from each other. The light shielding layer may overlap with the first and second transistors and may expose the first and second branch electrodes.

In an embodiment, the light shielding layer may cover a portion of each of the first and second branch electrodes.

In an embodiment, the first branch electrode may be electrically connected to a control electrode of the first transistor, and the second branch electrode may be electrically connected to one of an input electrode and an output electrode of the second transistor. The input and output electrodes are disposed on a layer different from a layer on which the control electrode of the first transistor is disposed.

In an embodiment, the light shielding layer may have a red color.

In an embodiment, the first display substrate may include a base substrate on which the first branch electrode is disposed, a first insulating layer covering the first branch electrode and disposed on the base substrate, a second insulating layer covering the second branch electrode and disposed on the first insulating layer, and a third insulating layer disposed on the second insulating layer. The third insulating layer may include a first contact hole exposing a portion of the first branch electrode; and a second contact hole exposing a portion of the second branch electrode. The connection electrode may be disposed on the third insulating layer and may extend into the first and second contact holes.

In an embodiment, the light shielding layer may be disposed on the second insulating layer to expose the first branch electrode and the second branch electrode.

In an embodiment, the light shielding layer may be disposed on the third insulating layer to expose the first branch electrode and the second branch electrode.

In an embodiment, the light shielding layer may cover the connection electrode to overlap with a portion of each of the first and second branch electrodes.

In an embodiment, the connection electrode may electrically connect the portion of the first branch electrode to the portion of the second branch electrode through the first and second contact holes.

In an embodiment, the first contact hole may include a first sub-contact hole exposing a first portion of the first branch electrode, and a second sub-contact hole exposing a second portion, spaced apart from the first portion, of the first branch electrode. The second contact hole may include a third sub-contact hole exposing a first portion of the second branch electrode, and a fourth sub-contact hole exposing a second portion, spaced apart from the first portion, of the second branch electrode.

In an aspect of the invention, a display device may include a display panel including a first display substrate, a second display substrate facing the first display substrate and a liquid crystal layer disposed between the first display substrate and the second display substrate, and a light source. The first display substrate may include a driving circuit and a light shielding layer overlapping with a non-display area, and a pixel electrode connected to the driving circuit and overlapping with a display area.

The second display substrate may include a color conversion layer having a first illuminant that absorbs first color light to emit second color light having a color that is different from the color of the first color light. The light source may provide the first color light to the display panel. The driving circuit may include a first transistor, a second transistor, a first branch electrode connected to the first transistor and disposed on a first layer, a second branch electrode connected to the second transistor and disposed on a second layer, the second branch electrode overlapping with the first branch electrode in a direction parallel to a surface of the first display substrate, and a connection electrode connecting the first and second branch electrodes disposed on different layers from each other. The light shielding layer may cover the first and second transistors and may expose the first and second branch electrodes.

In an embodiment, the color conversion layer may include a conversion part overlapping with the display area and including the first illuminant, and a dummy conversion part overlapping with the non-display area.

In an embodiment, the conversion part may further include a second illuminant that absorbs the first color light to emit third color light having a color that is different from the color of the second color light.

In an embodiment, the dummy conversion part may include at least one of the first illuminant and the second illuminant.

In an embodiment, the conversion part may include a first conversion part including the first illuminant, a second conversion part including the second illuminant, and a third conversion part transmitting the first color light.

In an embodiment, the first, second and third conversion parts may be spaced apart from each other in a direction parallel to a surface of the second display substrate, and the color conversion layer may further include a black matrix disposed between the first to third conversion parts spaced apart from each other.

In an embodiment, the first color light may be blue light.

In an embodiment, the second display substrate may further include an in-cell polarizing layer that includes a wire grid pattern disposed between the liquid crystal layer and the color conversion layer and overlapping with the display area and the non-display area.

In an embodiment, the first branch electrode may be electrically connected to a control electrode of the first transistor, and the second branch electrode may be electrically connected to an input electrode of the second transistor, is the input electrode of the second transistor being disposed on a layer different from a layer on which the control electrode of the first transistor is disposed.

In an embodiment, the first branch electrode may be electrically connected to a control electrode of the first transistor, and the second branch electrode may be electrically connected to a control electrode of the second transistor, the control electrode of the second transistor being disposed on a layer different from a layer on which the control electrode of the first transistor is disposed.

BRIEF DESCRIPTION OF THE DRAWINGS

The above and other aspects and features of the present invention will become more apparent by describing in further detail exemplary embodiments thereof with reference to the accompanying drawings, in which.

DETAILED DESCRIPTION OF THE EMBODIMENTS

Figure 1A:
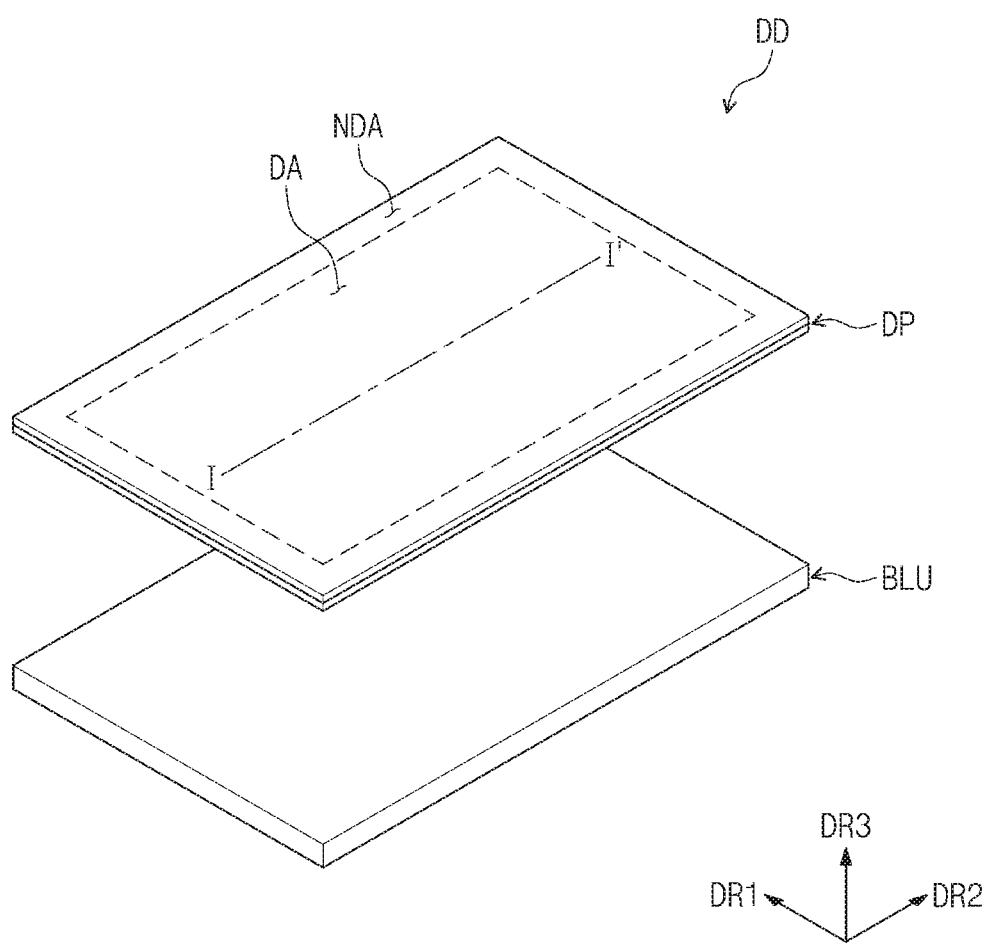
FIG. 1A is an exploded perspective view illustrating a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout. It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items. The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of exemplary embodiments.

Figure 1B:
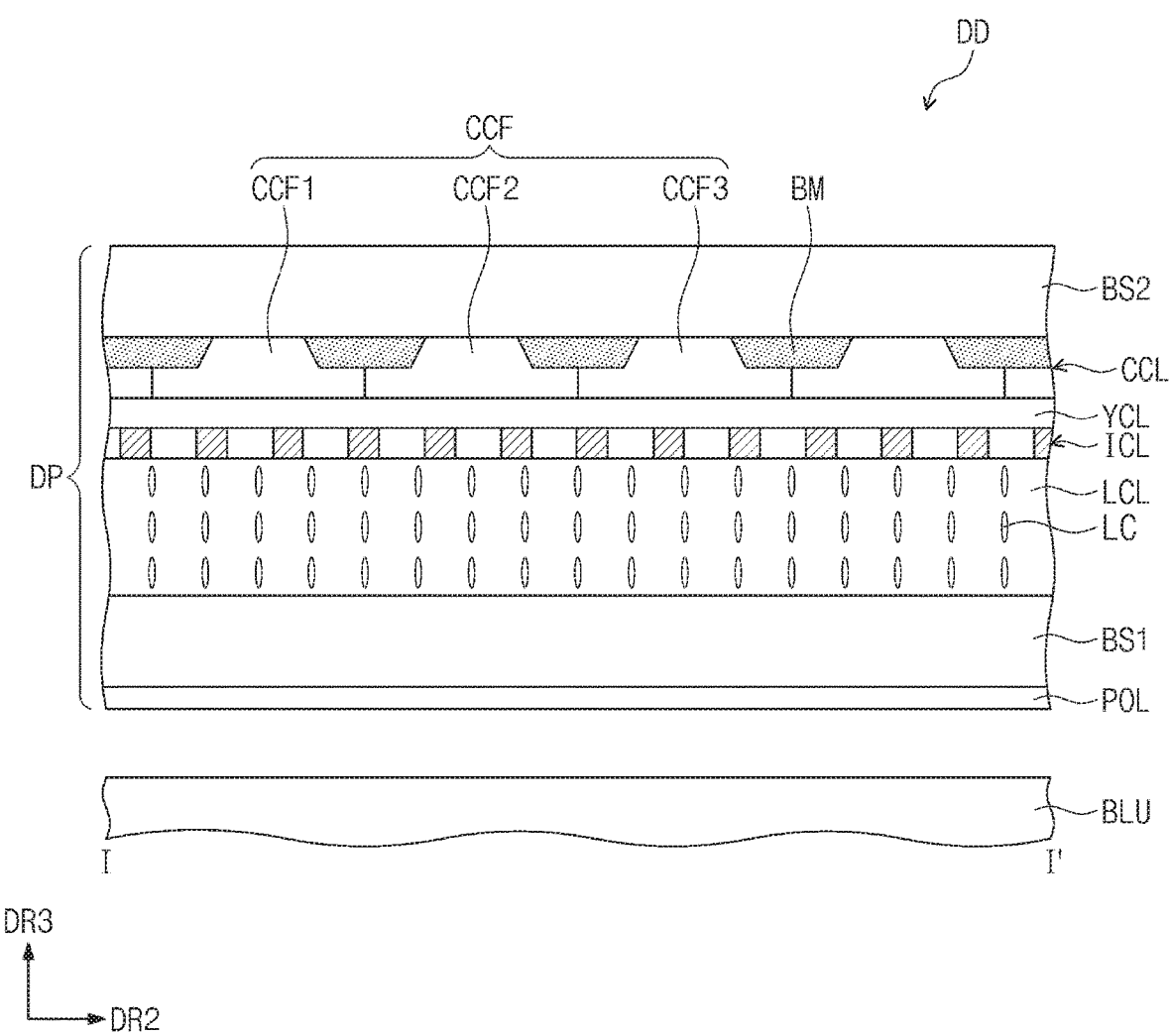
FIG. 1B is a cross-sectional view taken along a line I-I' of FIG. 1A to illustrate a display device according to an embodiment of the invention.
Figure 1C:
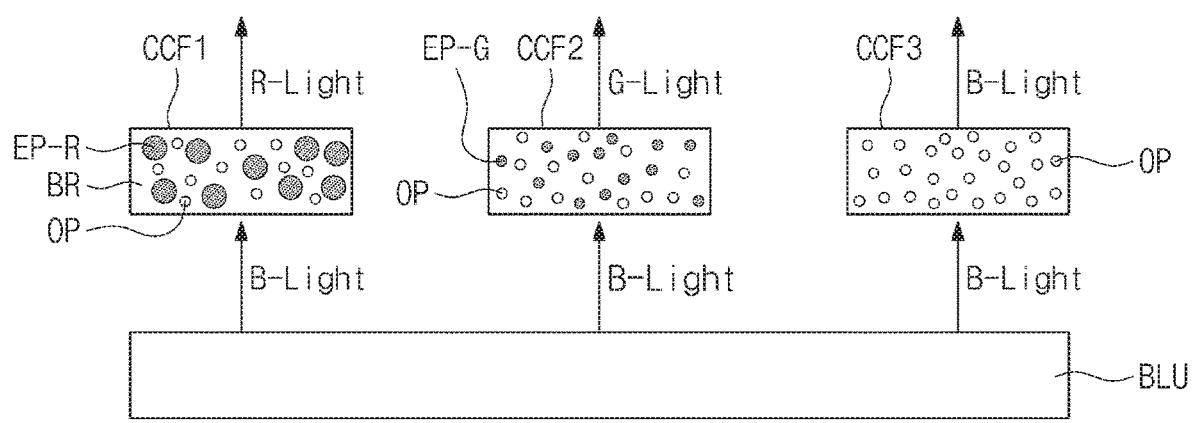
FIG. 1C is a schematic view illustrating optical characteristics of conversion parts according to an embodiment of the invention.

FIG. 1A is an exploded perspective view illustrating a display device according to an embodiment of the invention. FIG. 1B is a cross-sectional view taken along a line I-I' of FIG. 1A to illustrate a display device according to an embodiment of the invention. FIG. 1C is a schematic view illustrating optical characteristics of conversion parts according to an embodiment of the invention.

According to embodiments of the invention, a display device DD illustrated in FIG. 1A may be applied to a tablet personal computer, a smart phone, a personal digital assistant (PDA), a portable multimedia player (PMP), a game console, and a watch-type electronic device. In addition, the display device DD may also be applied to large-sized electronic devices (e.g., a large television and/or an external billboard) and small and middle-sized electronic devices (e.g., a personal computer, a notebook computer, a car navigation unit, and/or a camera).

Referring to FIG. 1A, the display device DD may include a display panel DP and a light source BLU providing light to the display panel DP. The display panel DP may provide an image, and the light source BLU may generate light of a first color (hereinafter, referred to as 'first color light').

The light source BLU may be disposed under the display panel DP to provide the first color light to the display panel DP. For example, the first color light provided from the light source BLU may be blue light. Alternatively, the first color light may be ultraviolet light. For example, the light source BLU may provide light of which a wavelength ranges from 350 nm to 450 nm.

The light source BLU may include a plurality of light emitting elements. The light emitting elements may emit blue light as the first color light. The light source BLU may include the plurality of light emitting elements and a circuit substrate providing power to the light emitting elements. The light emitting elements may be disposed on the circuit substrate.

The first color light generated from the light source BLU may be provided to the display panel DP. The display panel DP may be disposed on the light source BLU. The display panel DP may include a display area DA displaying an image and a non-display area NDA not displaying an image. The non-display area NDA may be disposed adjacent to the display area DA. In an embodiment, the non-display area NDA may surround the display area DA.

According to embodiments of the invention, the display panel DP may be provided as an organic light emitting display panel, a liquid crystal display panel, a plasma display panel, an electrophoretic display panel, a microelectromechanical system (MEMS) display panel, or an electrowetting display panel.

The embodiment in which the display panel DP is the liquid crystal display panel will be described hereinafter. The display panel DP may be a twisted nematic liquid crystal display panel, a horizontal alignment type liquid crystal display panel, or a vertical alignment type liquid crystal display panel. In some embodiments, the display panel DP according to the invention may be provided as the vertical alignment type liquid crystal display panel in which liquid crystal molecules are aligned in a predetermined direction and long axes of the liquid crystal molecules are vertical to a surface of a substrate when an electric field is not applied.

The display panel DP may be parallel to a plane defined by a first direction DR1 and a second direction DR2. A normal direction of the display panel DP may be indicated by a third direction DR3. The third direction DR3 may indicate a thickness direction of the display panel DP. A top surface (or a front surface) and a bottom surface (or a back surface) of each of members may be defined by the third direction DR3. However, the directions DR1, DR2 and DR3 may be relative concepts and may be changed into other directions.

Meanwhile, the display device DD having a flat shape is illustrated in FIG. 1A. However, embodiments of the invention are not limited thereto. In an embodiment, the display device DD may be a curved display device. For example, the display device DD may be a curved display device which is wholly concavely or convexly curved when a user views the display device. Alternatively, the display device DD may be a display device of which only a portion is bent.

In an embodiment, the display device DD may be a flexible display device. For example, the display device DD may be a foldable display device or a rollable display device.

In an embodiment, the display area DA of the display panel DP may include a plurality of pixel areas (not shown). The pixel areas (not shown) may be defined by, for example, a plurality of gate lines and a plurality of data lines. The pixel areas (not shown) may be arranged in a matrix form. A pixel may be disposed in each of the pixel areas (not shown). These will be described in more detail with reference to FIGS. 2 and 3.

Referring to FIG. 1B, a cross-sectional view of the display area DA of the display panel DP is illustrated as an example. The display panel DP may include a first base substrate BS1, a second base substrate BS2 facing the first base substrate BS1, and a liquid crystal layer LCL. The liquid crystal layer LCL may be disposed between the first base substrate BS1 and the second base substrate BS2. Hereinafter, a term 'overlap' means that two components overlap with each other in the third direction DR3 which is a thickness direction of the display panel DP.

The first base substrate BS1 and the second base substrate BS2 may each independently be a polymer substrate, a plastic substrate, a glass substrate, or a quartz substrate. The first base substrate BS1 and the second base substrate BS2 may be transparent insulating substrates. In an embodiment, each of the first and second base substrates BS1 and BS2 may be rigid. In another embodiment, each of the first and second base substrates BS1 and BS2 may be flexible.

Meanwhile, even though not shown in the drawings, the first base substrate BS1 and the second base substrate BS2 may include a pixel electrode and a common electrode, respectively.

Figure 7A:
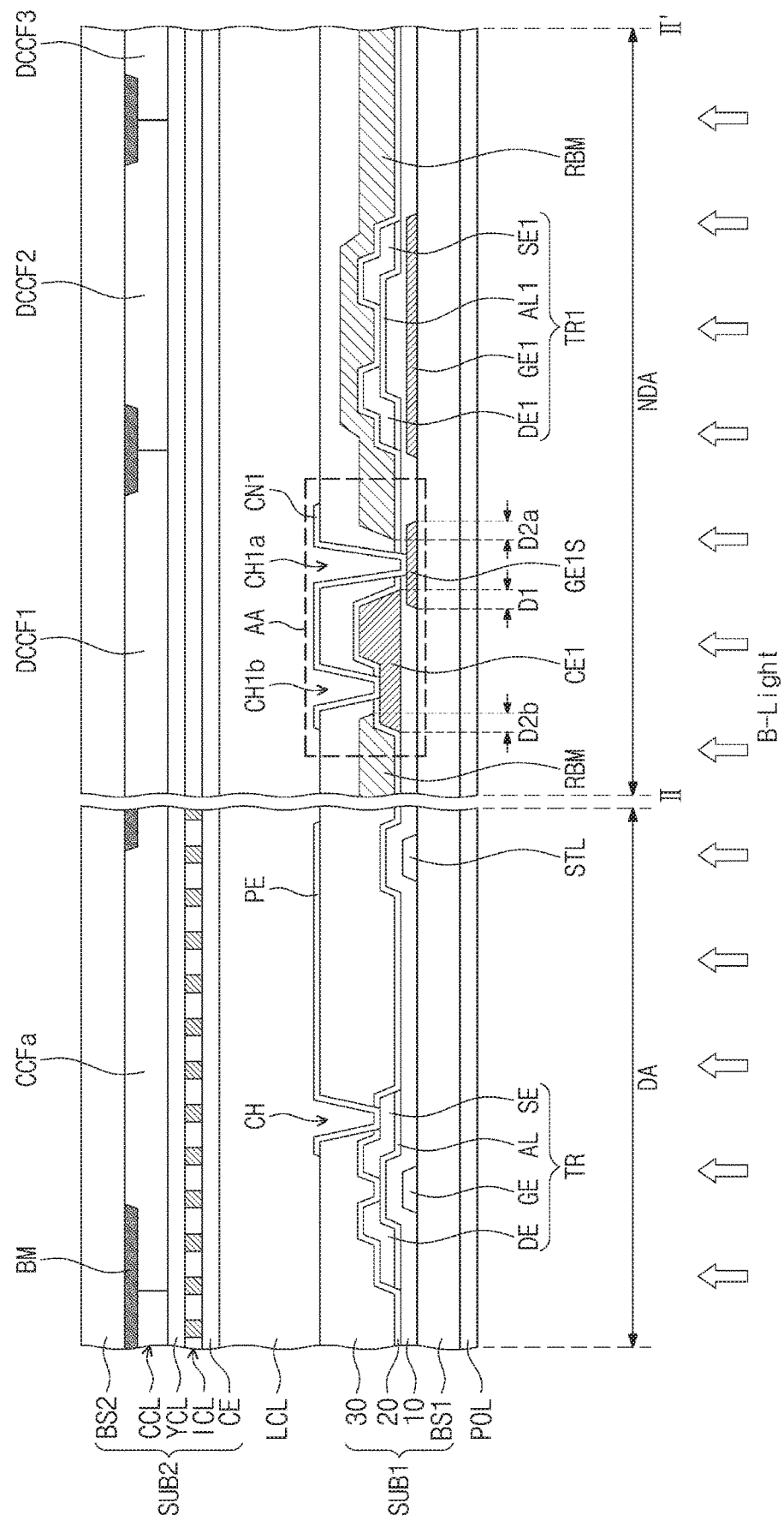
FIG. 7A is a cross-sectional view taken along a line II-II' of FIG. 6 to illustrate a display device according to an embodiment of the invention.

The pixel electrode may be disposed on a top surface of the first base substrate BS1 (see FIG. 7A). The common electrode may be disposed on a bottom surface of the second base substrate BS2 (see FIG. 7A). Here, the top surface of the first base substrate BS1 may be adjacent to the liquid crystal layer LCL and may face the second base substrate BS2. The bottom surface of the second base substrate BS2 may be adjacent to the liquid crystal layer LCL and may face the first base substrate BS1.

The liquid crystal layer LCL may be disposed between the first and second base substrates BS1 and BS2 and may include a plurality of liquid crystal molecules LC. The liquid crystal molecules LC having dielectric anisotropy may be arranged to constitute the liquid crystal layer LCL. Commonly used liquid crystal molecules may be used in the liquid crystal layer LCL, and the liquid crystal molecules LC are not limited to specific liquid crystal molecules. For example, the liquid crystal molecules LC may be formed of an alkenyl-based liquid crystal compound or an alkoxy-based liquid crystal compound. The liquid crystal molecules LC used in the embodiments of the invention may have negative dielectric anisotropy. However, embodiments of the invention are not limited thereto. In other embodiments, liquid crystal molecules LC having positive dielectric anisotropy may be used in the liquid crystal layer LCL.

A color conversion layer CCL may be disposed between the liquid crystal layer LCL and the second base substrate BS2. The color conversion layer CCL may be disposed on the bottom surface of the second base substrate BS2. The color conversion layer CCL may include an illuminant that absorbs the first color light provided from the light source BLU to emit light of a color different from the first color.

In more detail, referring to FIG. 1C, the color conversion layer CCL may include a first conversion part CCF1 including a first illuminant EP-R, a second conversion part CCF2 including a second illuminant EP-G, and a third conversion part CCF3 transmitting the first color light.

For example, the first illuminant EP-R may absorb the first color light (e.g., the blue light B-Light) and may emit red light R-Light. The second illuminant EP-G may absorb the first color light (e.g., the blue light B-Light) and may emit green light G-Light. Hereinafter, the red light is referred to as 'second color light', and the green light is referred to as 'third color light'. In other words, the first conversion part CCF1 may be a light emitting area emitting the red light, and the second conversion part CCF2 may be a light emitting area emitting the green light.

The third conversion part CCF3 may not include an illuminant. The third conversion part CCF3 may transmit the first color light provided from the light source BLU. In other words, the third conversion part CCF3 may be a light emitting area emitting the blue light.

Each of the first to third conversion parts CCF1, CCF2 and CCF3 may include a base resin BR. The base resin BR may be a polymer resin. For example, the base resin BR may be an acrylic-based resin, a urethane-based resin, a silicon-based resin, or an epoxy-based resin. The base resin BR may be a transparent resin.

In addition, the first to third conversion parts CCF1, CCF2 and CCF3 may further include scattering particles OP. The scattering particles OP may be $TiO_2$ or silica-based nanoparticles. The scattering particles OP may scatter light emitted from the illuminant to output the light to the outside of the conversion part. In the third conversion part CCF3 transmitting the provided light without changing the provided light, the scattering particles OP may scatter the provided light to output the provided light to the outside.

The first and second illuminants EP-R and EP-G included in the color conversion layer CCL may be fluorescent substances or quantum dots. In other words, in an embodiment, the color conversion layer CCL may include at least one of the fluorescent substances or the quantum dots as the illuminants EP-R and EP-G.

For example, the fluorescent substances used as the illuminants EP-R and EP-G may be inorganic fluorescent substances. In the display device DD according to an embodiment, the fluorescent substances used as the illuminants EP-R and EP-G may be a red fluorescent substance and a green fluorescent substance.

The green fluorescent substance may include at least one selected from a group consisting of $YBO_3:Ce^{3+},Tb^{3+}$, $BaMgAl_{10}O_{17}:Eu^{2+}, Mn^{2+}$, $(Sr,Ca,Ba)(Al,Ga)_2S_4:Eu^{2+}$; $ZnS:Cu,Al$, $Ca_8Mg(SiO_4)_4Cl_2: Eu^{2+},Mn^{2+}$; $Ba_2SiO_4: Eu^{2+}$; $(Ba,Sr)_2SiO_4:Eu^{2+}$; $Ba_2(Mg, Zn)Si_2O_7:Eu^{2+}$; $(Ba,Sr)Al_2O_4:Eu^{2+}$, $Sr_2Si_3O_8 \cdot 2SrCl_2:Eu^{2+}$.

The red fluorescent substance may include at least one selected from a group consisting of $(Sr,Ca,Ba,Mg)P_2O_7: Eu^{2+}, Mn^{2+}, CaLa_2S_4:Ce^{3+}$; $SrY_2S_4: Eu^{2+}, (Ca,Sr)S: Eu^{2+}, SrS:Eu^{2+}, Y_2O_3: Eu^{3+},Bi^{3+}$; $YVO_4: Eu^{3+},Bi^{3+}$; $Y_2O_2S: Eu^{3+},Bi^{3+}$; $Y_2O_2S: Eu^{3+}$.

However, the kinds of the fluorescent substances used in the color conversion layer CCL are not limited to the materials described above. In other words, the fluorescent substances may use other known fluorescent substances in addition to the fluorescent substance materials described above.

In other embodiments, the illuminants EP-R and EP-G included in the color conversion layer CCL may be the quantum dots. The quantum dot may be formed of a group II-VI compound, a group III-V compound, a group IV-VI compound, a group IV element, a group IV compound, or any combination thereof.

The group II-VI compound may be selected from a group consisting of a binary compound selected from a group consisting of CdSe, CdTe, ZnS, ZnSe, ZnTe, ZnO, HgS, HgSe, HgTe, MgSe, MgS, and any mixture thereof; a ternary compound selected from a group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and any mixture thereof; and a quaternary compound selected from a group consisting of HgZnTeS, CdZnSeS, CdZnSeTe, CdZnSTe, CdHgSeS, CdHgSeTe, CdHgSTe, HgZnSeS, HgZnSeTe, HgZnSTe, and any mixture thereof.

The group III-V compound may be selected from a group consisting of a binary compound selected from a group consisting of GaN, GaP, GaAs, GaSb, AN, AlP, AlAs, AlSb, InN, InP, InAs, InSb, and any mixture thereof; a ternary compound selected from a group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and any mixture thereof; and a quaternary compound selected from a group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and any mixture thereof. The group IV-VI compound may be selected from a group consisting of a binary compound selected from a group consisting of SnS, SnSe, SnTe, PbS, PbSe, PbTe, and any mixture thereof; a ternary compound selected from a group consisting of SnSeS, SnSeTe, SnSTe, PbSeS, PbSeTe, PbSTe, SnPbS, SnPbSe, SnPbTe, and any mixture thereof; and a quaternary compound selected from a group consisting of SnPbSSe, SnPbSeTe, SnPbSTe, and any mixture thereof. The group IV element may be selected from a group consisting of Si, Ge, and a mixture thereof. The group IV compound may be a binary compound selected from a group consisting of SiC, SiGe, and a mixture thereof.

In these cases, the binary compound, the ternary compound, or the quaternary compound may exist in the quantum dot with a substantially uniform concentration. Alternatively, a concentration of the binary compound, the ternary compound or the quaternary compound in a portion of the quantum dot may be different from that of the binary compound, the ternary compound or the quaternary compound in another portion of the quantum dot.

The quantum dot may have a core-shell structure including a core and a shell surrounding the core. Alternatively, the conversion part may have a core/shell structure in which one quantum dot surrounds another quantum dot. An interface of the core and the shell may have a concentration gradient in which a concentration of an element existing in the shell becomes progressively less toward a center.

The quantum dot may be a nano-sized particle. The quantum dot may have a full width of half maximum (FWHM) of an emission wavelength spectrum that is about 45 nm or less (in particular, about 40 nm or less, and in more particular, about 30 nm or less), and color purity and/or color reproduction can be improved in the range. In addition, light emitted through the quantum dot may be emitted in all directions, and thus a wide viewing angle can be improved or realized.

Furthermore, a shape of the quantum dot may be a general shape known in the art but is not limited to a specific shape. For example, the quantum dot may have a spherical shape, a pyramidal shape, a multi-arm shape, a cubic nanoparticle shape, a nanotube shape, a nanowire shape, a nanofiber shape, or a nano-plate particle shape.

According to an embodiment of the invention, a color of light emitted from the quantum dot may be changed depending on a particle size of the quantum dot. When the first illuminant EP-R and the second illuminant EP-G are the quantum dots, a particle size of the first illuminant EP-R may be different from a particle size of the second illuminant EP-G. For example, the particle size of the second illuminant EP-G may be smaller than the particle size of the first illuminant EP-R. In this case, a wavelength of light emitted from the second illuminant EP-G may be shorter than a wavelength of light emitted from the first illuminant EP-R.

Referring again to FIG. 1B, a black matrix BM may be disposed between the conversion parts CCF1, CCF2 and CCF3. The black matrix BM may have a black color and may be included in the color conversion layer CCL. The black matrix BM may include an organic or inorganic light shielding material which includes a black pigment or dye. The black matrix BM may prevent a leakage phenomenon of light and may form a boundary between the conversion parts adjacent to each other.

A light control layer YCL may be disposed between the color conversion layer CCL and an in-cell polarizing layer ICL. The light control layer YCL may overlap with the display area DA and the non-display area NDA and may be disposed on a bottom surface of the color conversion layer CCL. The light control layer YCL may transmit the first color light incident thereto and may partially absorb the second color light and the third color light incident thereto. In another embodiment, the light control layer YCL may overlap with only the display area DA. In still another embodiment, the light control layer YCL may be omitted.

The display panel DP may include a polarizing layer POL and the in-cell polarizing layer ICL. The polarizing layer POL may have a polarization axis in one direction, and the in-cell polarizing layer ICL may have a polarization axis in another direction perpendicular to the one direction.

As illustrated in FIG. 1B, the polarizing layer POL may be disposed on a bottom surface of the first base substrate BS1. The polarizing layer POL may transmit light vibrating in parallel to the polarization axis in the one direction. The polarizing layer POL may be a polarizing layer formed by a coating method or a polarizing layer formed by a deposition method. For example, the polarizing layer POL may be formed by performing the coating method using a material including a dichroic dye and a liquid crystal compound.

The in-cell polarizing layer ICL may be disposed between the color conversion layer CCL and the liquid crystal layer LCL. The in-cell polarizing layer ICL may transmit light vibrating in parallel to the other direction perpendicular to the one direction.

In an embodiment, the in-cell polarizing layer ICL may include a metal material. For example, the in-cell polarizing layer ICL may include at least one of aluminum (Al), silver (Ag), or molybdenum-titanium oxide (MTO).

In an embodiment, the in-cell polarizing layer ICL may include a wire grid pattern overlapping with the display area DA and the non-display area NDA. In another embodiment, the in-cell polarizing layer ICL may overlap with only the display area DA or may overlap with the display area DA and only a portion of the non-display area NDA. The wire grid pattern may transmit light vibrating in parallel to the other direction perpendicular to the one direction.

Figure 2:
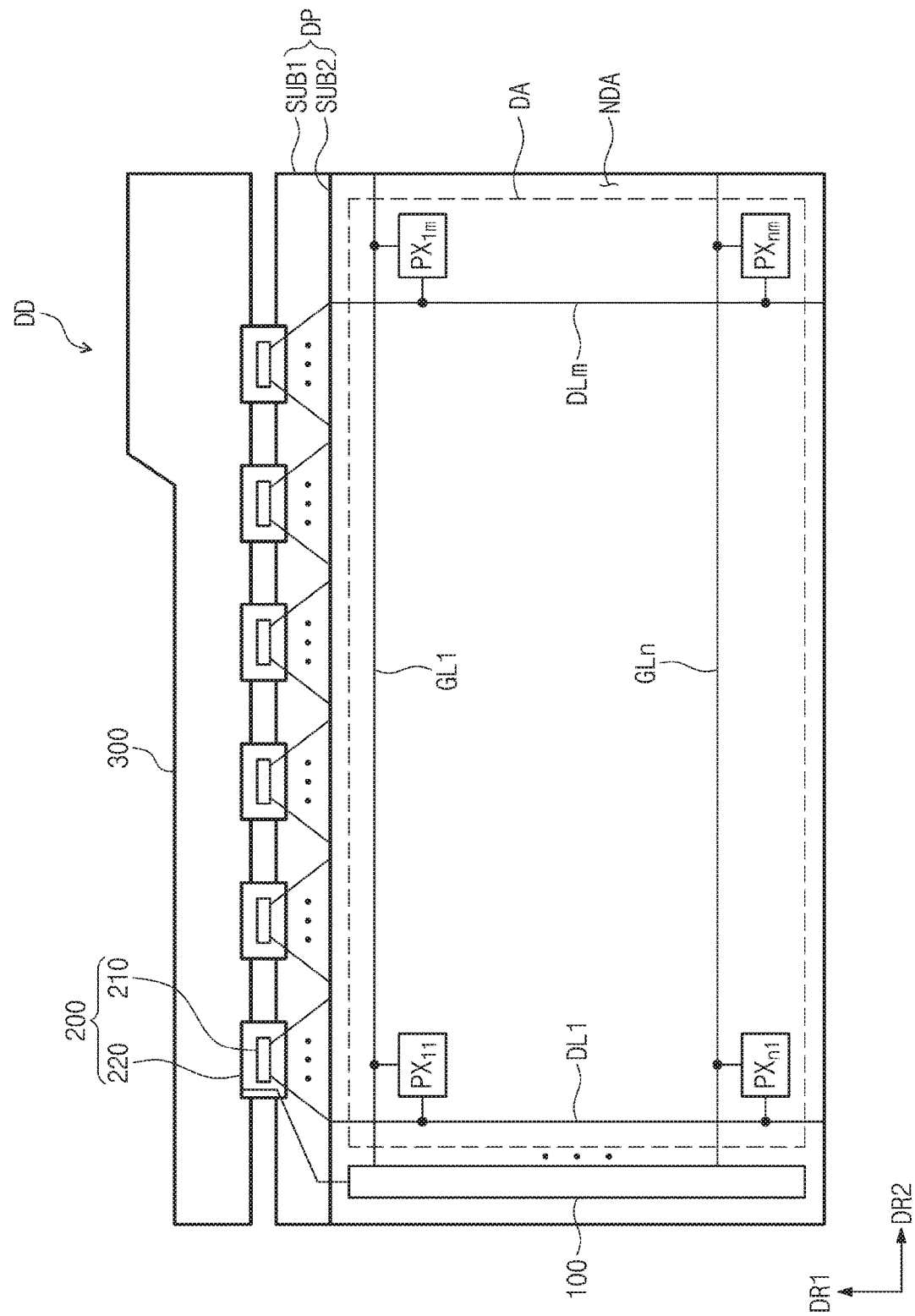
FIG. 2 is a block diagram illustrating a display device according to an embodiment of the invention.
Figure 3:
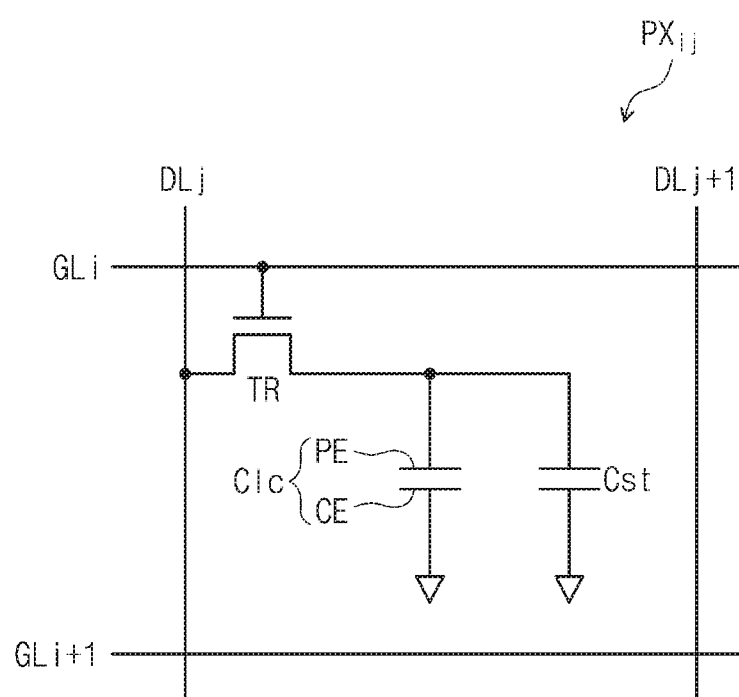
FIG. 3 is an equivalent circuit diagram of a pixel illustrated in FIG. 2.

FIG. 2 is a block diagram illustrating a display device according to an embodiment of the invention. FIG. 3 is an equivalent circuit diagram of a pixel illustrated in FIG. 2.

Referring to FIG. 2, a display panel DP may include a display area DA in which a plurality of pixels $PX_{11}$ to $PX_{nm}$ is formed, and a non-display area NDA surrounding the display area DA.

A plurality of gate lines GL1 to GLn and a plurality of data lines DL1 to DLm intersecting the gate lines GL1 to GLn may be disposed on a first display substrate SUB1. Some of the plurality of gate lines GL1 to GLn and some of the plurality of data lines DL1 to DLm are illustrated in FIG. 2 for the purpose of ease and convenience in illustration. The first display substrate SUB1 may include the first base substrate BS1 illustrated in FIG. 1B.

The plurality of gate lines GL1 to GLn may be connected to a gate driving circuit 100 and may sequentially receive gate signals from the gate driving circuit 100. The plurality of data lines DL1 to DLm may be connected to a data driving circuit 200 and may receive analog data signals (or data voltages) from the data driving circuit 200.

Each of the pixels $PX_{11}$ to $PX_{nm}$ may be connected to a corresponding one of the plurality of gate lines GL1 to GLn and a corresponding one of the plurality of data lines DL1 to DLm.

The gate driving circuit 100 may be formed simultaneously with the pixels $PX_{11}$ to $PX_{nm}$ by thin film processes. For example, the gate driving circuit 100 may be integrated in the non-display area NDA of the display panel DP by an oxide silicon gate driver circuit (OSG) process or an amorphous silicon gate driver circuit (ASG) process.

In FIG. 2, the gate driving circuit 100 is connected to left ends of the gate lines GL1 to GLn. However, embodiments of the invention are not limited thereto. In another embodiment, the display device may include two gate driving circuits. One of the two gate driving circuits may be connected to left ends of at least some of the gate lines GL1 to GLn, and the other of the two gate driving circuits may be connected to right ends of at least others of the gate lines GL1 to GLn. In addition, one of the two gate driving circuits may be connected to odd-numbered gate lines, and the other thereof may be connected to even-numbered gate lines.

The data driving circuit 200 may receive data signals from a signal controller (not shown) mounted on a circuit substrate 300 and may generate analog data signals corresponding to the data signals.

The data driving circuit 200 may include a driving chip 210 and a flexible circuit substrate 220 on which the driving chip 210 is mounted. Each of the driving chip 210 and the flexible circuit substrate 220 may be provided in plurality. The flexible circuit substrate 220 may electrically connect the circuit substrate 300 and the first display substrate SUB1 to each other. Each of the driving chips 210 may provide some of the data signals to corresponding ones of the data lines DL1 to DLm.

The data driving circuit 200 formed in the form of a tape carrier package (TCP) is illustrated as an example in FIG. 2. Alternatively, the data driving circuit 200 may be mounted on the first display substrate SUB1 by a chip-on-glass (COG) method.

Each of the pixels $PX_{11}$ to $PX_{nm}$ illustrated in FIG. 2 may have an equivalent circuit illustrated in FIG. 3. As illustrated in FIG. 3, a pixel $PX_{ij}$ may include a thin film transistor TR, a liquid crystal capacitor Clc, and a storage capacitor Cst. The thin film transistor TR may be electrically connected to an $i^{th}$ gate line GLi and a $j^{th}$ data line DLj. The thin film transistor TR may output a data signal received from the $j^{th}$ data line DLj in response to a gate signal received from the $i^{th}$ gate line GLi.

The liquid crystal capacitor Clc may include a pixel electrode PE and a common electrode CE. The pixel electrode PE may be electrically connected to the thin film transistor TR and may receive a data voltage corresponding to the data signal outputted from the $j^{th}$ data line DLj. The common electrode CE may receive a common voltage. Arrangement of liquid crystal directors (not shown) included in the liquid crystal layer may be changed depending on a difference between the data voltage of the pixel electrode PE and the common voltage of the common electrode CE in the liquid crystal capacitor Clc. Light incident to the liquid crystal layer may be transmitted or blocked according to the arrangement of the liquid crystal directors.

The storage capacitor Cst may be connected in parallel to the liquid crystal capacitor Clc. The storage capacitor Cst may maintain the arrangement of the liquid crystal directors for a certain period.

Meanwhile, the gate driving circuit 100 may include a transistor connected to the thin film transistor TR. The transistor of the gate driving circuit 100 and the thin film transistor TR may be disposed on a first base substrate BS1 (see FIG. 7) by the same thin film processes.

In this case, the transistor of the gate driving circuit 100 may be disposed on the first base substrate BS1 to overlap with the non-display area NDA, and the thin film transistor TR may be disposed on the first base substrate BS1 to overlap with the display area DA.

Figure 4:
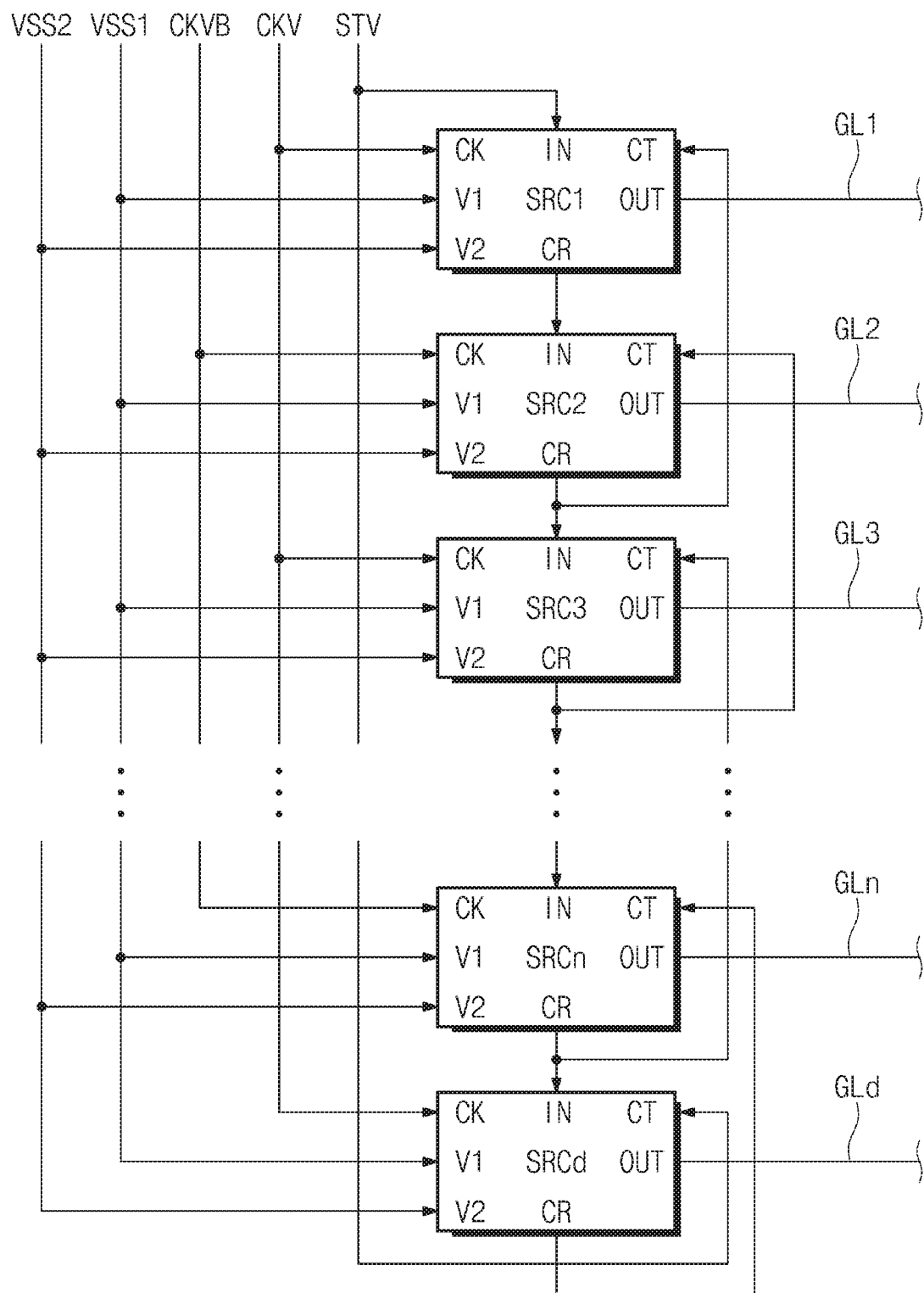
FIG. 4 is a block diagram illustrating a gate driving circuit of FIG. 2.
Figure 5:
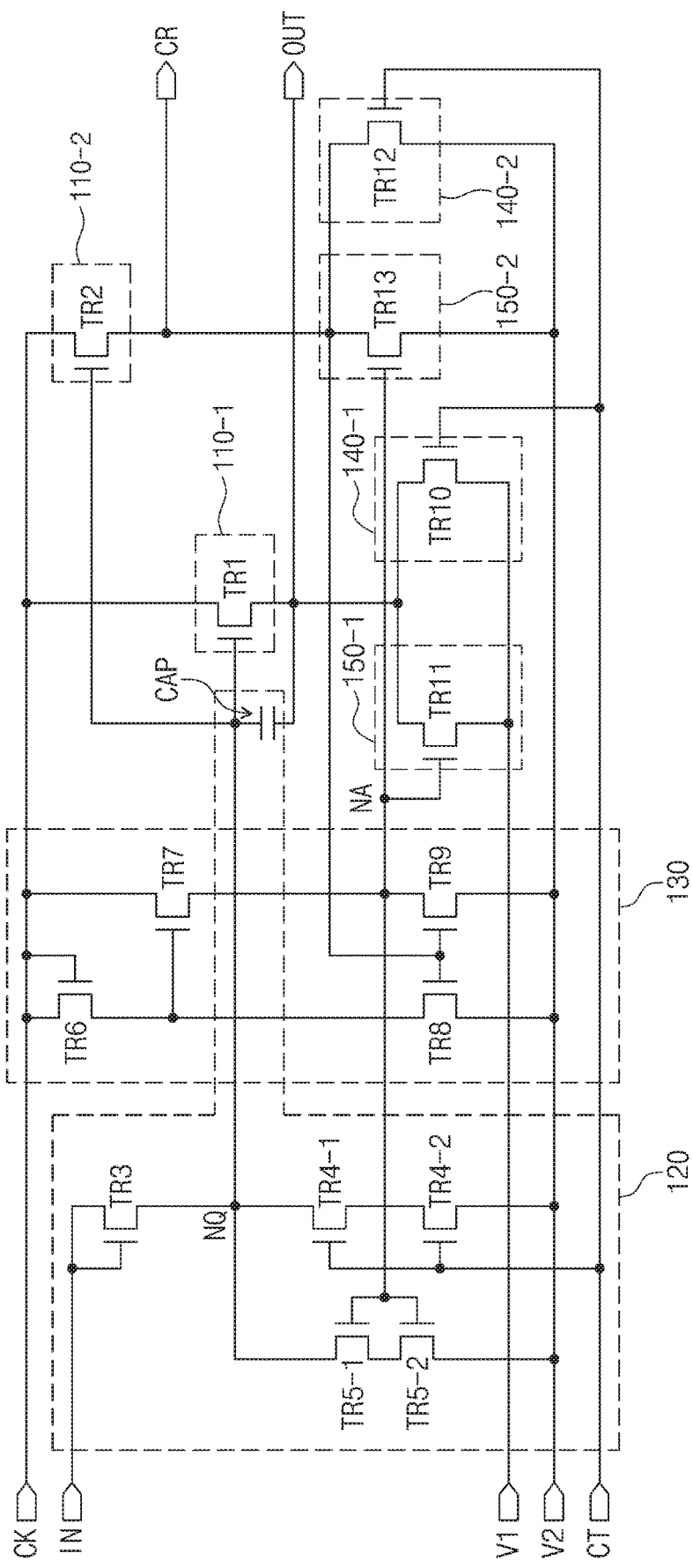
FIG. 5 is a circuit diagram of an $i^{th}$ stage of a plurality of stages illustrated in FIG. 4.

FIG. 4 is a block diagram illustrating a gate driving circuit of FIG. 2. FIG. 5 is a circuit diagram of an $i^{th}$ stage of a plurality of stages illustrated in FIG. 4.

Referring to FIG. 4, the gate driving circuit 100 may include a plurality of stages SRC1 to SRCn. The stages SRC1 to SRCn may constitute a shift register. As illustrated in FIG. 4, the stages SRC1 to SRCn may be connected to each other serially, that is, one after another.

The stages SRC1 to SRCn may be connected to the gate lines GL1 to GLn, respectively. In other words, the stages SRC1 to SRCn may provide gate signals to the gate lines GL1 to GLn, respectively.

Each of the stages SRC1 to SRCn may include an input terminal IN, a clock terminal CK, first and second voltage input terminals V1 and V2, a control terminal CT, an output terminal OUT, and a carry terminal CR.

The carry terminal CR of each of the stages SRC1 to SRCn may be electrically connected to the input terminal IN of a next stage. The input terminal IN of a first stage SRC1 may receive a vertical start signal STV for starting to drive the gate driving circuit 100, instead of a carry signal of a previous stage. The input terminal IN of each of the stages SRC2 to SRCn after the first stage SRC1 may receive a carry signal of a previous stage. The input terminal IN of an $i^{th}$ stage may be electrically connected to the carry terminal CR of an $i-1^{th}$ stage. Here, T is an integral number greater than 1 and equal to or less than 'n'. The input terminal IN of a second stage SRC2 and the input terminal IN of a third stage SRC3 may receive a carry signal of the first stage SRC1 and a carry signal of the second stage SRC2, respectively.

However, embodiments of the invention are not limited thereto. In certain embodiments, the input terminal IN of the $i^{th}$ stage may be electrically connected to the carry terminal CR of a previous stage, e.g., the carry terminal CR of the $i-1^{th}$ stage, an $i-2^{th}$ stage or an $i-3^{th}$ stage. For example, the second stage SRC2 may receive a start signal different from the start signal provided to the first stage SRC1, and the input terminal IN of the third stage SRC3 may receive the carry signal of the first stage SRC1.

The control terminal CT of each of the stages SRC1 to SRCn may be electrically connected to the carry terminal CR of the next stage and may receive the carry signal of the next stage.

The control terminal CT of an $i^{th}$ stage may be electrically connected to the carry terminal CR of an $i+1^{th}$ stage. The control terminal CT of the first stage SRC1 may be electrically connected to the carry terminal CR of the second stage SRC2.

However, the control terminal CT of the last stage SRCn of the stages SRC1 to SRCn may receive a signal, which corresponds to the carry signal, from a dummy stage SRCd. The dummy stage SRCd may be connected to a rear end of the last stage SRCn. However, the position and the number of the dummy stage SRCd may be variously changed.

However, embodiments of the invention are not limited thereto. In certain embodiments, the control terminal CT of the $i^{th}$ stage may be electrically connected to the carry terminal CR of any stage after the $i^{th}$ stage. In other words, FIG. 4 illustrates an example of the gate driving circuit 100, and the connections of the stages SRC1 to SRCn of FIG. 4 may be variously changed.

A phase of a signal applied to odd-numbered ones (e.g., SRC1, SRC3, etc.) of the stages SRC1 to SRCn may be opposite to that of a signal applied to even-numbered ones (e.g., SRC2, SRC4, etc.) of the stages SRC1 to SRCn. The clock terminals CK of the odd-numbered stages SRC1, SRC3, etc. may receive a clock signal CKV, and the clock terminals CK of the even-numbered stages SRC2, SRC4, etc. may receive a clock bar signal CKVB.

A phase difference between the clock signal CKV and the clock bar signal CKVB may be 180 degrees. Each of the clock signal CKV and the clock bar signal CKVB may swing between a first clock voltage and a second clock voltage. The first clock voltage may range from about 15V to about 35V. The second clock voltage may range from about −16V to about −10V.

A first low-voltage VSS1 may be applied to the first voltage input terminal V1 of each of the stages SRC1 to SRCn. A second low-voltage VSS2 of which a voltage level is higher than that of the first low-voltage VSS1 may be applied to the second voltage input terminal V2 of each of the stages SRC1 to SRCn. The second low-voltage VSS2 may range from about −10V to about −5V and the first low-voltage VSS1 may range from about −16V to about −10V. For example, the first low-voltage VSS1 may be −11.5V, and the second low-voltage VSS2 may be −7.5V. The first low-voltage VSS1 may have the same voltage level as the second clock voltage.

The output terminal OUT of each of the stages SRC1 to SRCn may be connected to a corresponding one of the gate lines GL1 to GLn. In other words, the output terminals OUT of the stages SRC1 to SRCn may sequentially output first to $n^{th}$ gate signals to the gate lines GL1 to GLn.

FIG. 5 illustrates an $i^{th}$ stage of the stages SRC1 to SRCn of FIG. 4 as an example. Each of the stages SRC1 to SRCn of FIG. 4 may have the same circuit as the $i^{th}$ stage illustrated in FIG. 5.

Referring to FIG. 5, the $i^{th}$ stage may include an output part 110-1 and 110-2, a control part 120, an inverter part 130, a pull-down part 140-1 and 140-2, and a holding part 150-1 and 150-2. The output part 110-1 and 110-2 may include a first output part 110-1 for outputting an $i^{th}$ gate signal and a second output part 110-2 for outputting an $i^{th}$ carry signal. The pull-down part 140-1 and 140-2 may include a first pull-down part 140-1 for pulling down the output terminal OUT and a second pull-down part 140-2 for pulling down the carry terminal CR. The holding part 150-1 and 150-2 may include a first holding part 150-1 for holding the output terminal OUT in a down state and a second holding part 150-2 for holding the carry terminal CR in a down state.

The circuit of the $i^{th}$ stage of FIG. 5 is illustrated as an example. In certain embodiments, the circuit of the $i^{th}$ stage may be variously modified.

The first output part 110-1 may include a first output transistor TR1. The first output transistor TR1 may include an input electrode receiving the clock signal provided from the clock terminal CK, a control electrode connected to a Q-node NQ, and an output electrode outputting the $i^{th}$ gate signal.

The second output part 110-2 may include a second output transistor TR2. The second output transistor TR2 may include an input electrode receiving the clock signal, a control electrode connected to the Q-node NQ, and an output electrode outputting the $i^{th}$ carry signal.

The control part 120 may control operations of the first output part 110-1 and the second output part 110-2. The control part 120 may turn on the first and second output parts 110-1 and 110-2 in response to an $i-1^{th}$ carry signal provided from an $i-1^{th}$ stage to the input terminal IN. The control part 120 may turn off the first and second output parts 110-1 and 110-2 in response to an $i+1^{th}$ carry signal outputted from an $i+1^{th}$ stage. In addition, the control part 120 may maintain the turned-off state of the first and second output parts 110-1 and 110-2 in accordance with a switching signal outputted from the inverter part 130.

The control part 120 may include a first control transistor TR3, second control transistors TR4-1 and TR4-2, third control transistors TR5-1 and TR5-2, and a capacitor CAP. In the present embodiment, two second control transistors TR4-1 and TR4-2 connected in series to each other and two third control transistors TR5-1 and TR5-2 connected in series to each other are illustrated as an example.

The first control transistor TR3 may output a control signal to the Q-node N, which controls potential of the Q-node NQ. The first control transistor TR3 may be connected in the form of a diode between the input terminal IN and the Q-node NQ to form a current path from the input terminal IN to the Q-node NQ. The first control transistor TR3 may include a control electrode and an input electrode, which are connected in common to the input terminal IN. In addition, the first control transistor TR3 may further include an output electrode connected to the Q-node NQ.

The capacitor CAP may be connected between the output electrode of the first output transistor TR1 and the control electrode of the first output transistor TR1 (or the Q-node NQ).

The two second control transistors TR4-1 and TR4-2 may be connected in series between the second voltage input terminal V2 and the Q-node NQ. Control electrodes of the two second control transistors TR4-1 and TR4-2 may be connected in common to the control terminal CT. The two second control transistors TR4-1 and TR4-2 may provide the second low-voltage VSS2 to the Q-node NQ in response to the $i+1^{th}$ carry signal outputted from the $i+1^{th}$ stage. In an embodiment of the invention, the two second control transistors TR4-1 and TR4-2 may be turned on by the $i+1^{th}$ carry signal.

The two third control transistors TR5-1 and TR5-2 may be connected in series between the second voltage input terminal V2 and the Q-node NQ. Control electrodes of the two third control transistors TR5-1 and TR5-2 may be connected in common to an A-node NA. The two third control transistors TR5-1 and TR5-2 may provide the second low-voltage VSS2 to the Q-node NQ in response to the switching signal outputted from the inverter part 130.

In an embodiment of the invention, one of the two second control transistors TR4-1 and TR4-2 may be omitted, and one of the two third control transistors TR5-1 and TR5-2 may be omitted. In an embodiment, the second control transistors TR4-1 and TR4-2 or the third control transistors TR5-1 and TR5-2 may be connected to the first voltage input terminal V1, not the second voltage input terminal V2.

The inverter part 130 may output the switching signal to the A-node NA. The inverter part 130 may include first to fourth inverter transistors TR6, TR7, TR8 and TR9. The first inverter transistor TR6 may include an input electrode and a control electrode connected in common to the clock terminal CK, and an output electrode connected to a control electrode of the second inverter transistor TR7. The second inverter transistor TR7 may include an input electrode connected to the clock terminal CK, an output electrode connected to the A-node NA, and the control electrode connected to the output electrode of the first inverter transistor TR6.

The third inverter transistor TR8 may include an output electrode connected to the output electrode of the first inverter transistor TR6, a control electrode connected to the carry terminal CR, and an input electrode connected to the second voltage input terminal V2. The fourth inverter transistor TR9 may include an output electrode connected to the A-node NA, a control electrode connected to the carry terminal CR, and an input electrode connected to the second voltage input terminal V2. According to another embodiment of the invention, the control electrodes of the third and fourth inverter transistors TR8 and TR9 may be connected to the output terminal OUT, and the input electrodes of the third and fourth inverter transistors TR8 and TR9 may be connected to the first voltage input terminal V1.

The first pull-down part 140-1 may include a first pull-down transistor TR10. The first pull-down transistor TR10 may include an input electrode connected to the first voltage input terminal V1, a control electrode connected to the control terminal CT, and an output electrode connected to the output electrode of the first output transistor TR1. According to another embodiment, the input electrode of the first pull-down transistor TR10 may be connected to the second voltage input terminal V2.

The second pull-down part 140-2 may include a second pull-down transistor TR12. The second pull-down transistor TR12 may include an input electrode connected to the second voltage input terminal V2, a control electrode connected to the control terminal CT, and an output electrode connected to the output electrode of the second output transistor TR2. According to another embodiment, the input electrode of the second pull-down transistor TR12 may be connected to the first voltage input terminal V1.

The first holding part 150-1 may include a first holding transistor TR11. The first holding transistor TR11 may include an input electrode connected to the first voltage input terminal V1, a control electrode connected to the A-node NA, and an output electrode connected to the output electrode of the first output transistor TR1. According to another embodiment, the input electrode of the first holding transistor TR11 may be connected to the second voltage input terminal V2.

The second holding part 150-2 may include a second holding transistor TR13. The second holding transistor TR13 may include an input electrode connected to the second voltage input terminal V2, a control electrode connected to the A-node NA, and an output electrode connected to the output electrode of the second output transistor TR2. According to another embodiment, the input electrode of the second holding transistor TR13 may be connected to the first voltage input terminal V1.

Figure 6:
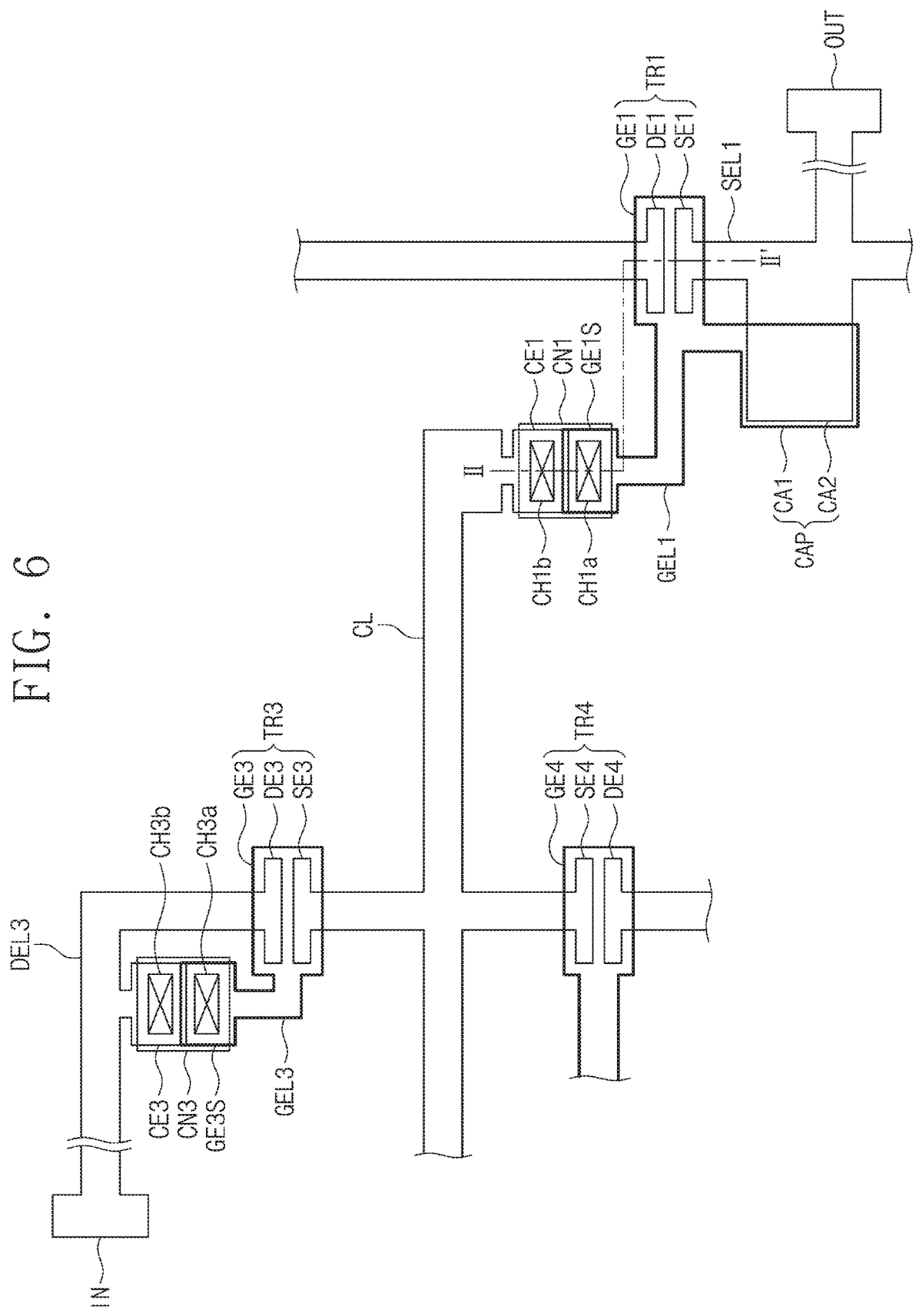
FIG. 6 is a layout of a portion of the stage circuit illustrated in FIG. 5 according to an embodiment of the invention.

FIG. 6 is a layout of a portion of the stage circuit illustrated in FIG. 5 according to an embodiment of the invention.

The first output transistor TR1, the first control transistor TR3 and the second control transistor TR4-1 of the i$^{th}$ stage of FIG. 5 and connection structures therebetween are illustrated as an example in FIG. 6. Here, the first output transistor TR1, the first control transistor TR3 and the second control transistor TR4-1 have the same transistor structure.

Referring to FIG. 6, the first output transistor TR1 may include a control electrode GE1, an input electrode DE1, and an output electrode SE1. In an embodiment, the control electrode GE1 may be disposed on a layer different from a layer on which the input electrode DE1 and the output electrode SE1 are disposed, and the input electrode DE1 and the output electrode SE1 may be disposed on the same layer.

The first control transistor TR3 may include a control electrode GE3, an input electrode DE3, and an output electrode SE3. In an embodiment, the control electrode GE3 may be disposed on a layer different from a layer on which the input electrode DE3 and the output electrode SE3 are disposed, and the input electrode DE3 and the output electrode SE3 may be disposed on the same layer. In this case, the control electrode GE3 may be disposed on the same layer as the control electrode GE1. The input electrode DE3 and the output electrode SE3 may be disposed on the same layer as the input electrode DE1 and the output electrode SE1.

The second control transistor TR4-1 may include a control electrode GE4, an input electrode DE4, and an output electrode SE4. In an embodiment, the control electrode GE4 may be disposed on a layer different from a layer on which the input electrode DE4 and the output electrode SE4 are disposed, and the input electrode DE4 and the output electrode SE4 may be disposed on the same layer. In this case, the control electrode GE4 may be disposed on the same layer as the control electrode GE3. The input electrode DE4 and the output electrode SE4 may be disposed on the same layer as the input electrode DE3 and the output electrode SE3.

In an embodiment, the input electrode and the output electrode of each transistor may be exchanged with each other. In other words, the input electrode and the output electrode of each transistor may be exchanged with each other by circuit configuration of the i$^{th}$ stage.

The control electrode GE1 of the first output transistor TR1 may be connected to a first branch electrode GE1S and a first electrode CA1 through a control electrode line GEL1. The control electrode line GEL1, the first branch electrode GE1S, the first electrode CA1 and the control electrode GE1 may be disposed on the same layer on a first base substrate BS1 (see FIG. 7A). The output electrode SE1 of the first output transistor TR1 may be connected to a second electrode CA2 and the output terminal OUT through an output electrode line SEL1. The output electrode line SEL1, the output electrode SE1, the output terminal OUT and the second electrode CA2 may be disposed on the same layer on the first base substrate BS1.

The control electrode GE3 of the first control transistor TR3 may be connected to a third branch electrode GE3S through a control electrode line GEL3. The control electrode line GEL3, the control electrode GE3 and the third branch electrode GE3S may be disposed on the same layer on the first base substrate BS1. The input electrode DE3 of the first control transistor TR3 may be connected to a fourth branch electrode CE3 and the input terminal IN through an input electrode line DEL3. The input electrode DE3, the input electrode line DEL3, the fourth branch electrode CE3 and the input terminal IN may be disposed on the same layer on the first base substrate BS1. The output electrode SE3 of the first control transistor TR3 may be connected to a second branch electrode CE1 and the output electrode SE4 of the second control transistor TR4-1 through a control line CL. The output electrode SE3, the control line CL, the second branch electrode CE1 and the output electrode SE4 may be disposed on the same layer on the first base substrate BS1.

According to an embodiment of the invention, the first branch electrode GE1S branched from the control electrode GE1 of the first output transistor TR1 may be disposed on the layer different from the layer on which the second branch electrode CE1 branched from the output electrode SE3 of the first control transistor TR3 is disposed. Thus, the first branch electrode GE1S and the second branch electrode CE1 may be connected to each other through a first contact hole CH1*a* and a second contact hole CH1*b*. In particular, the first branch electrode GE1S and the second branch electrode CE1 may be electrically connected to each other through a first connection electrode CN1 disposed in the first contact hole CH1*a* and the second contact hole CH1*b*. This will be described in more detail with reference to FIG. 7A.

According to an embodiment of the invention, the third branch electrode GE3S branched from the control electrode GE3 of the first control transistor TR3 may be disposed on the layer different from the layer on which the fourth branch electrode CE3 branched from the input electrode DE3 of the first control transistor TR3 is disposed. Thus, the third branch electrode GE3S and the fourth branch electrode CE3 may be connected to each other through a third contact hole CH3*a* and a fourth contact hole CH3*b*. In particular, the third branch electrode GE3S and the fourth branch electrode CE3 may be electrically connected to each other through a second connection electrode CN3 disposed in the third contact hole CH3*a* and the fourth contact hole CH3*b*. This will be described in more detail with reference to FIG. 7A.

As described above, the control electrodes of the transistors included in the i*th* stage of FIG. 6 may be disposed on the layer different from the layer on which the output electrodes and the input electrodes are disposed. Thus, in the event that a control electrode of a first transistor is connected to one of an input electrode and an output electrode of a second transistor, the two electrodes may be connected to each other through contact holes.

In the above embodiments of the invention, the control electrodes of the transistors are disposed on the same layer. However, embodiments of the invention are not limited thereto. In another embodiment, control electrodes of two transistors may be disposed on different layers from each other. In this case, the control electrode of one of the two transistors may be connected to the control electrode of the other of the two transistors through a contact hole.

In addition, the input electrodes and the output electrodes of the transistors are disposed on the same layer in the above embodiments. However, embodiments of the invention are not limited thereto. In another embodiment, two input electrodes or two output electrodes corresponding to two transistors may be disposed on different layers from each other.

Figure 8:
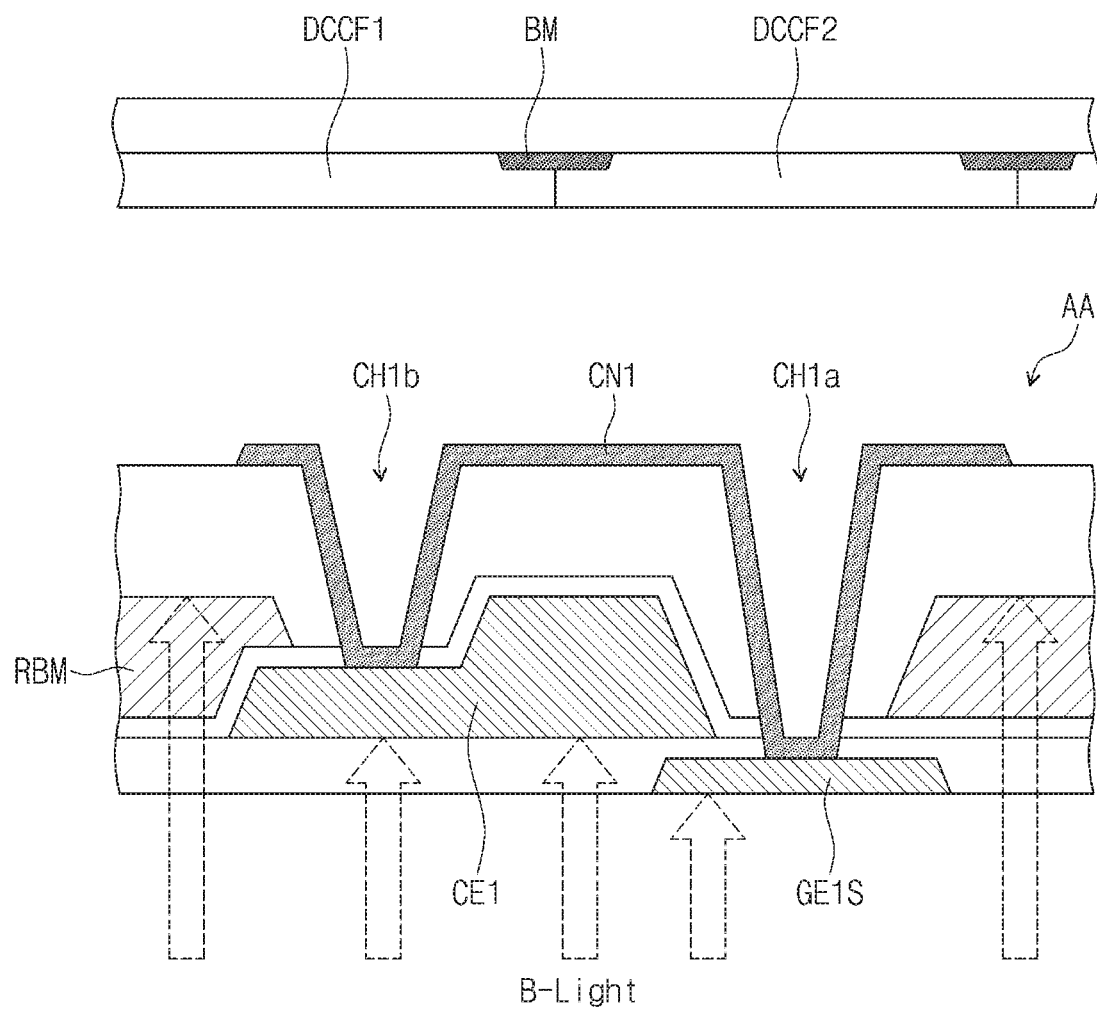
FIG. 8 is an enlarged view of a portion 'AA' of FIG. 7A.

FIG. 7A is a cross-sectional view taken along a line II-IF of FIG. 6. FIG. 8 is an enlarged view of a portion 'AA' of FIG. 7A.

FIG. 7A illustrates the first output transistor TR1 and the first and second branch electrodes GE1S and CE1 of FIG. 6 overlapping with the non-display area NDA of the display panel DP, and the thin film transistor TR (see FIG. 3) of the pixel disposed in the display area DA of the display panel DP. In the present embodiment of FIG. 7A, the descriptions to the same components as in the embodiment of FIG. 1B will be omitted or mentioned briefly for the purpose of ease and convenience in description.

Referring to FIG. 7A, a first display substrate SUB1 may include a first base substrate BS1, first to third insulating layers 10, 20 and 30, a pixel layer, a driving circuit, and a light shielding layer RBM.

The polarizing layer POL may be disposed on a bottom surface of the first base substrate BS1. In addition, a thin film transistor TR of a pixel included in the pixel layer may be disposed on the first base substrate BS1 to overlap with the display area DA. The thin film transistor TR may include a control electrode GE, an active layer AL overlapping with the control electrode GE, an input electrode DE connected to the data line DLj (see FIG. 3), and an output electrode SE spaced apart from the input electrode DE.

A first output transistor TR1 (hereinafter, referred to as 'a first transistor TR1') may be disposed on the first base substrate BS1 to overlap with the non-display area NDA. Here, the first transistor TR1 may be a transistor included in the driving circuit disposed in the non-display area NDA. The driving circuit may be the gate driving circuit 100 of FIG. 2 or the data driving circuit 200 of FIG. 2. The first transistor TR1 may include a control electrode GE1, an active layer AL1 overlapping with the control electrode GE1, an input electrode DE1, and an output electrode SE1 spaced apart from the input electrode DEL A second display substrate SUB2 may include a second base substrate BS2, a color conversion layer CCL, an in-cell polarizing layer ICL, and a common electrode CE. The second display substrate SUB2 of FIG. 7A may additionally include dummy conversion parts DCCF1, DCCF2 and DCCF3 of the color conversion layer CCL and the common electrode CE, as compared with the embodiment of FIG. 1B. Operations and structures of other components of the second display substrate SUB2 of FIG. 7A may be substantially the same as those of corresponding components of the embodiment of FIG. 1B.

The dummy conversion parts DCCF1, DCCF2 and DCCF3 may be disposed on the second base substrate BS2 (i.e., a bottom surface of the second base substrate BS2) to overlap with the non-display area NDA. In an embodiment, a conversion part CCFa of the display area DA and the dummy conversion parts DCCF1 to DCCF3 may be disposed on the second base substrate BS2 by the same process and thus may be disposed at substantially the same height. The conversion part CCFa may be one of the conversion parts CCF1 to CCF3 of FIG. 1B.

Two dummy conversion parts DCCF1 and DCCF2 among the dummy conversion parts DCCF1 to DCCF3 may include at least one of the illuminants EP-R and EP-G described above with reference to FIG. 1C. One dummy conversion part DCCF3 among the dummy conversion parts DCCF1 to DCCF3 may not include the illuminant. The illuminant of the dummy conversion parts DCCF1 and DCCF2 may emit red or green light when absorbing the first color light from the light source BLU.

In the display substrate SUB1 of FIG. 7A, the control electrode GE of the thin film transistor TR and a storage line STL, which overlap with the display area DA, may be disposed on the first base substrate BS1. In addition, the control electrode GE1 of the first transistor TR1 and a first branch electrode GE1S, which overlap with the non-display area NDA, may also be disposed on the first base substrate BS1. The first branch electrode GE1S may be an electrode branched from the control electrode GE1 and may be electrically connected to the control electrode GE1.

The first insulating layer 10 may be disposed on the first base substrate BS1 to cover the control electrode GE, the storage line STL, the first branch electrode GE1S, and the control electrode GE1.

The active layer AL, the input electrode DE and the output electrode SE, which overlap with the display area DA, may be disposed on the first insulating layer 10. The active layer AL may overlap with the control electrode GE and may include a semiconductor layer and an ohmic contact layer. The input electrode DE and the output electrode SE may be disposed on the active layer AL. Each of the input electrode DE and the output electrode SE may overlap with at least a portion of the active layer AL.

In addition, the active layer AL1, the input electrode DE1 and the output electrode SE1, which overlap with the non-display area NDA, may be disposed on the first insulating layer 10. The active layer AL1 may overlap with the control electrode GE1 and may include a semiconductor layer. The input electrode DE1 and the output electrode SE1 may be disposed on the active layer AL1. Each of the input electrode DE1 and the output electrode SE1 may overlap with at least a portion of the active layer AL1.

Furthermore, a second branch electrode CE1 overlapping with the non-display area NDA may be disposed on the first insulating layer 10. In particular, according to an embodiment of the invention, the second branch electrode CE1 may be disposed on the first insulating layer 10 to overlap with the first branch electrode GE1S in a direction parallel to the surface of the first display substrate SUB1, which is also referred to as the horizontal direction or the thickness direction of the first display substrate SUB1. In the present embodiment, the second branch electrode CE1 overlaps the first branch electrode GE1S by a first horizontal distance D1. In other words, the second branch electrode CE1 may overlap with at least a portion of the first branch electrode GE1S when viewed in a plan view. Alternately, the second branch electrode CE1 may overlap with at least a portion of the first branch electrode GE1S in a direction parallel to the surface of the first display substrate SUB1. Since the second branch electrode CE1 overlaps with the first branch electrode GE1S, external light may not pass between the first branch electrode GE1S and the second branch electrode CE1. Effect on this will be described later in detail.

The second branch electrode CE1 may be an electrode branched from the output electrode SE3 of the first control transistor TR3 (hereinafter, referred to as 'a second transistor') described with reference to FIG. 6. The second branch electrode CE1 is electrically connected to the output electrode SE3. In other words, the first transistor TR1 and the second transistor TR3 may be electrically connected to each other through the first branch electrode GE1S and the second branch electrode CE1.

The second insulating layer 20 may be disposed on the first insulating layer 10 to cover the first transistor TR1, the thin film transistor TR, and the second branch electrode CE1.

Meanwhile, the first color light B-Light outputted from the light source BLU may be transferred to the dummy conversion parts DCCF1 and DCCF2 through the liquid crystal layer LCL overlapping with the non-display area NDA. Thus, red or green light may be scattered by scattering particles included in the dummy conversion parts DCCF1 and DCCF2. As a result, the red or green light outputted from the dummy conversion parts DCCF1 and DCCF2 may be provided to a driving element disposed on the first base substrate BS1. The driving element may correspond to the transistors included in the stages SRC1 to SRCn for providing driving signals to the pixels disposed in the display area DA. Hereinafter, the driving element will be described as the first transistor TR1 for the purpose of ease and convenience in description.

When the light outputted from the dummy conversion parts DCCF1 and DCCF2 is provided to the first transistor TR1, the first transistor TR1 may be damaged or a function of the first transistor TR1 may be deteriorated.

In particular, the light shielding layer RBM according to an embodiment of the invention may have a red color. Thus, the light shielding layer RBM may absorb the green light of the light scattered by the dummy conversion parts DCCF1 and DCCF2 but may transmit the red light thereof. In other words, since the light shielding layer RBM transmits the scattered red light, the red light may be provided to the first transistor TR1 to damage the first transistor TR1.

However, according to the embodiment of the invention, the first display substrate SUB1 may prevent the first color light B-Light (e.g., blue light), which is provided from the light source BLU, from being transferred to the second display substrate SUB2 through the liquid crystal layer LCL.

In detail, the light shielding layer RBM may be disposed on the second insulating layer 20 to fully cover the transistors included in the plurality of stages SRC1 to SRCn illustrated in FIG. 4. However, as illustrated in FIG. 8, the light shielding layer RBM may expose a contact portion formed to connect branch electrodes of two transistors, which are disposed on different layers from each other. For example, as illustrated in FIG. 7A, the light shielding layer RBM may be disposed on the second insulating layer 20 to cover the first transistor TR1 but to expose the first branch electrode GE1S and the second branch electrode CE1.

In this case, the first color light B-Light outputted from the light source BLU may be transferred to the dummy conversion parts DCCF1 and DCCF2 of the second display substrate SUB2 through portions of the first and second branch electrodes GE1S and CE1, which do not overlap with the light shielding layer RBM.

However, according to the aforementioned embodiments of the invention, the first branch electrode GE1S and the second branch electrode CE1 may overlap with each other by the first horizontal distance D1. As a result, as illustrated in FIG. 8, the first color light B-Light outputted from the light source BLU may not pass between the first branch electrode GE1S and the second branch electrode CE1.

In addition, according to an embodiment of the invention, the light shielding layer RBM may cover a portion of the first branch electrode GE1S by a second horizontal distance D2a (FIG. 7A). As a result, as illustrated in FIG. 8, the first color light B-Light outputted from the light source BLU may not pass between the first branch electrode GE1S and the light shielding layer RBM.

Furthermore, according to an embodiment of the invention, the light shielding layer RBM may cover a portion of the second branch electrode CE1 by a third horizontal distance D2b (FIG. 7A). As a result, as illustrated in FIG. 8, the first color light B-Light outputted from the light source BLU may not pass between the second branch electrode CE1 and the light shielding layer RBM.

As described above, the first color light B-Light outputted from the light source BLU may not be transferred to the second display substrate SUB2 in the non-display area NDA by the light shielding layer RBM and the first and second branch electrodes GE1S and CE1 of the first display substrate SUB1. As a result, the first color light B-Light may not be provided to the dummy conversion parts DCCF1 and DCCF2, and thus it is possible to prevent the scattered red light from being provided to the first transistor TR1.

Returning to FIG. 7A, the third insulating layer 30 corresponding to a planarization layer may be provided on the second insulating layer 20. A pixel electrode PE may be disposed on the third insulating layer 30 in the display area DA. The pixel electrode PE may be connected to the output electrode SE through a contact hole CH penetrating the second and third insulating layers 20 and 30.

In an embodiment, the third insulating layer 30 may include a first contact hole CH1a exposing a portion of the first branch electrode GE1S and a second contact hole CH1b exposing a portion of the second branch electrode CE1.

A first connection electrode CN1 may be disposed on the third insulating layer 30 having the first and second contact holes CH1a and CH1b to electrically connect the first and second branch electrodes GE1S and CE1 to each other through the first and second contact holes CH1a and CH1b.

As described above, two transistors, connected to each other by two branch electrodes disposed on different layers, of the transistors of the driving circuit of the invention may have the structure illustrated in FIG. 7A.

Figure 7B:
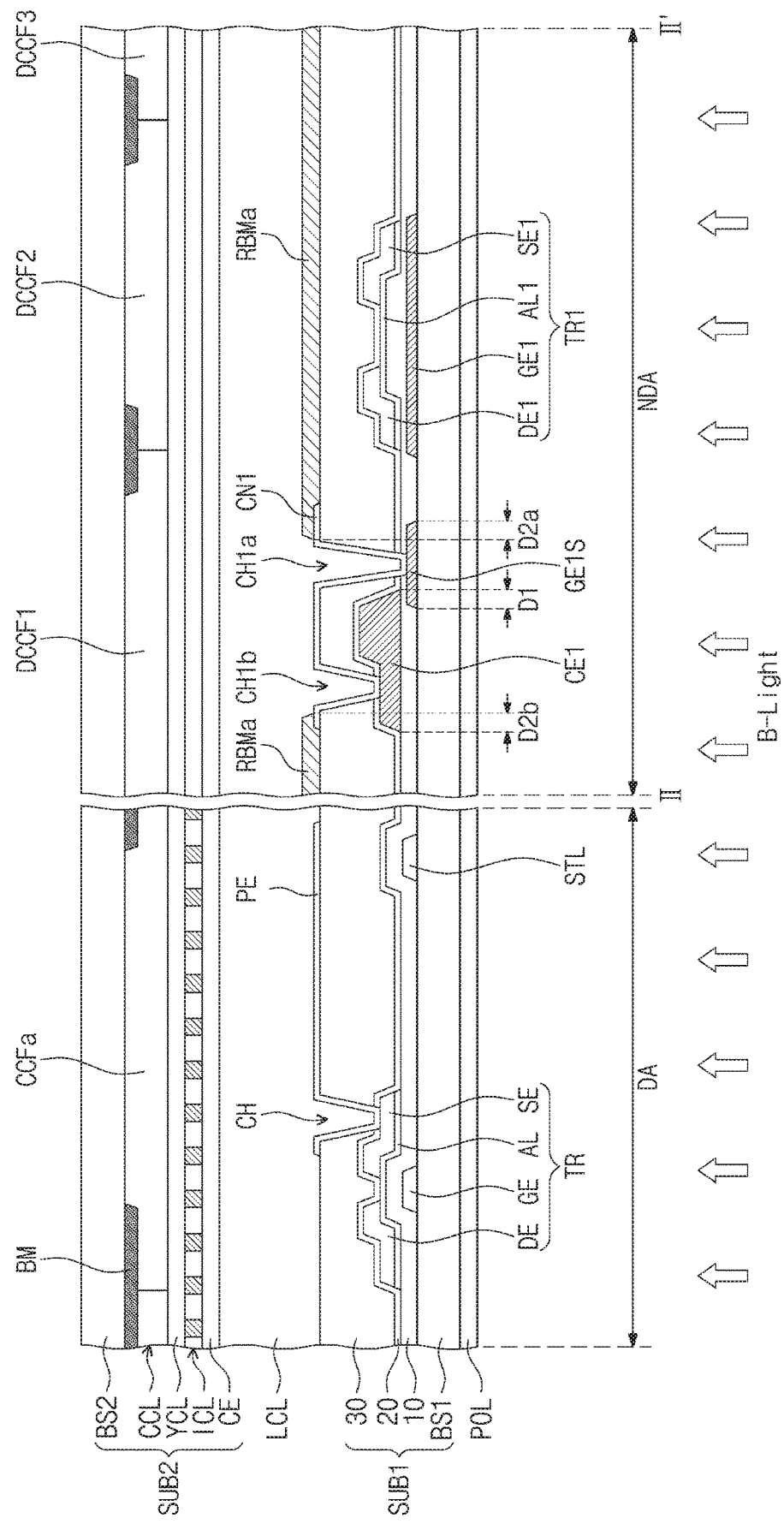
FIG. 7B is a cross-sectional view taken along the line II-II' of FIG. 6 to illustrate a display device according to another embodiment of the invention.

A structure of a light shielding layer RBMa in a display panel of FIG. 7B is different from that of the light shielding layer RBM in the display panel of FIG. 7A. Other components of the display panel of FIG. 7B may be substantially the same as corresponding components of the display panel of FIG. 7A. Thus, the descriptions to the other components will be omitted.

Referring to FIG. 7B, the light shielding layer RBMa may be disposed on the third insulating layer 30, not the second insulating layer 20. In this case, the light shielding layer RBMa may cover the first connection electrode CN1 to overlap with a portion of the first branch electrode GE1S. In addition, the light shielding layer RBMa may cover the first connection electrode CN1 to overlap with a portion of the second branch electrode CE1.

Figure 9:
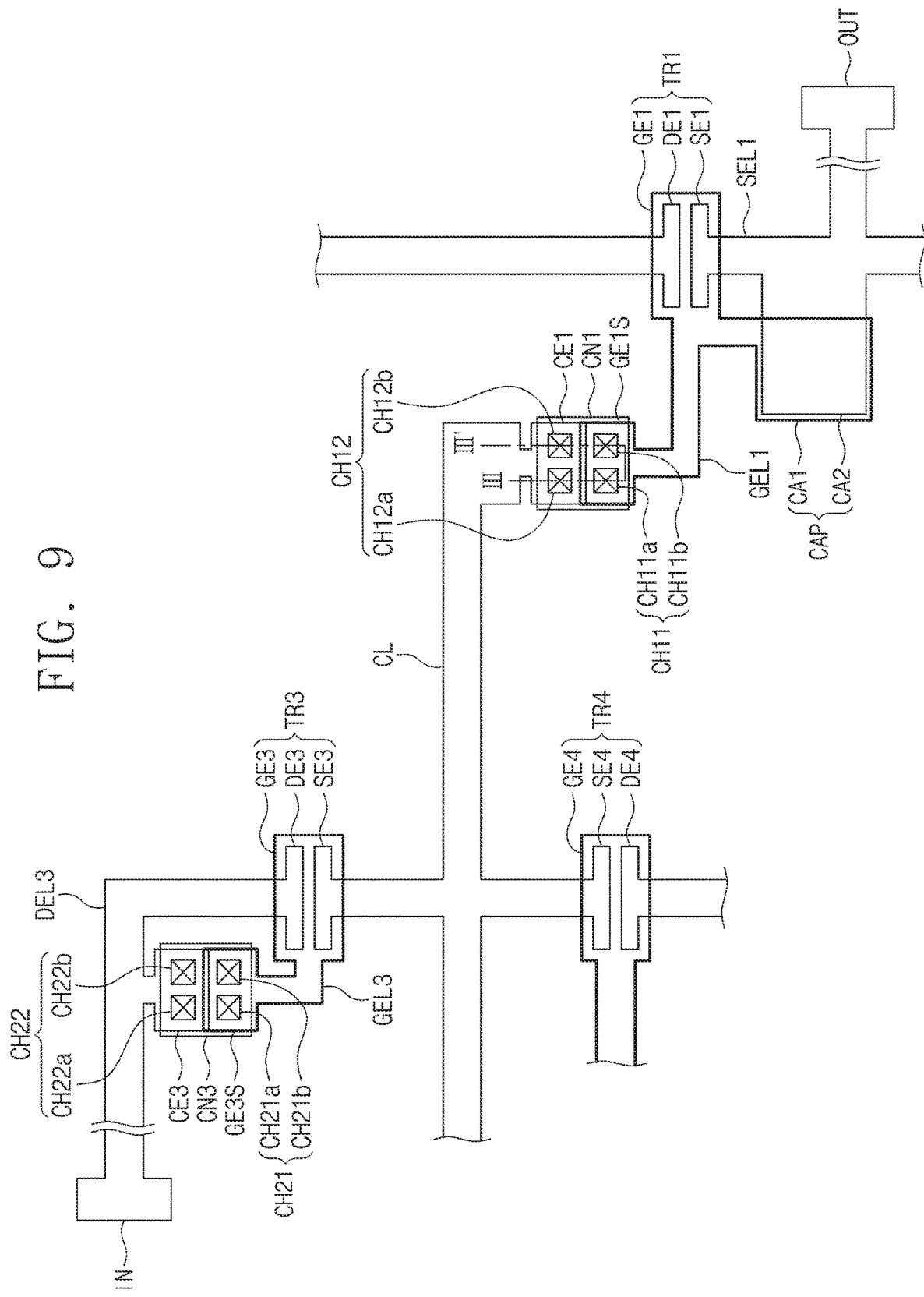
FIG. 9 is a layout of a portion of the stage circuit illustrated in FIG. 5 according to another embodiment of the invention.
Figure 10:
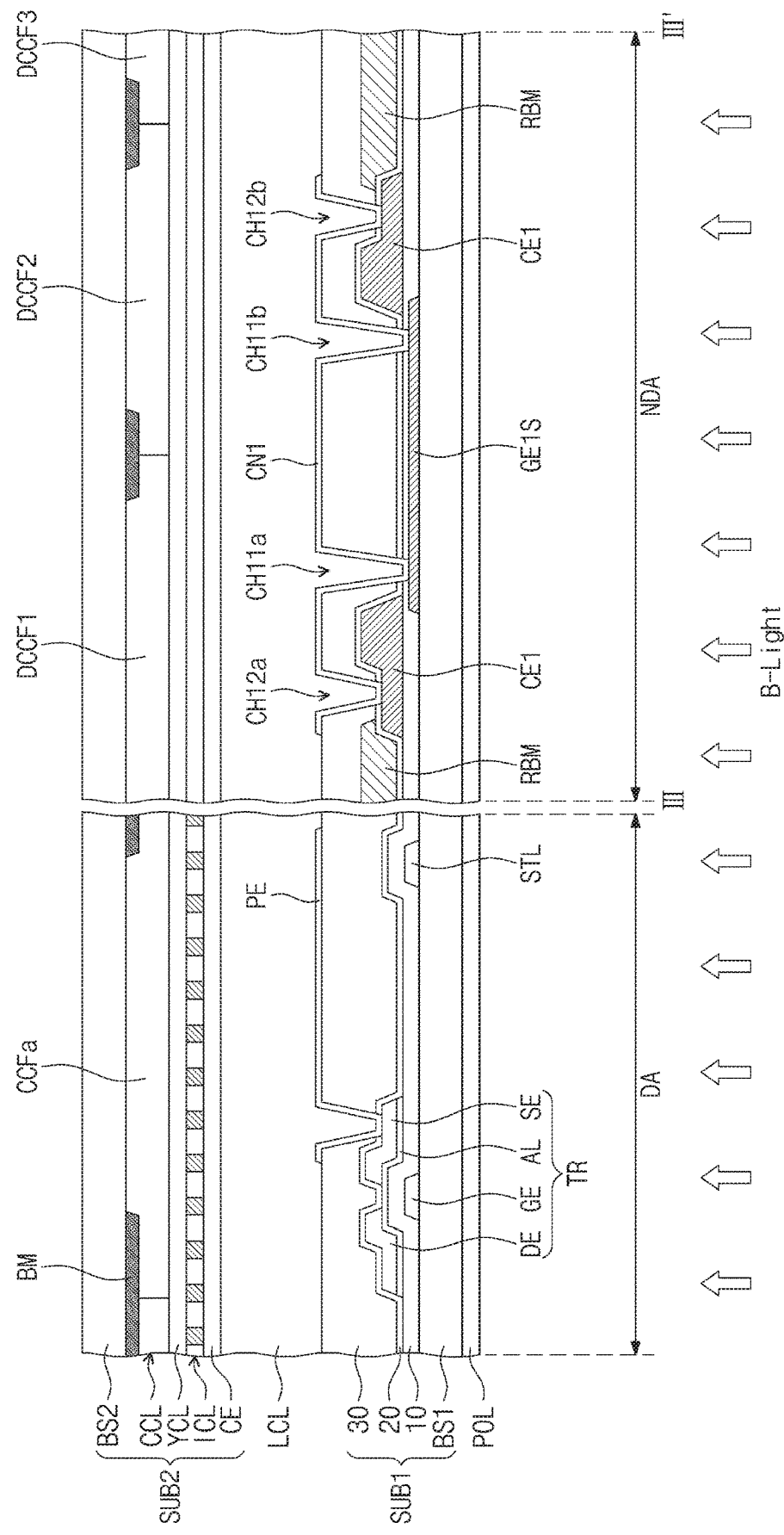
FIG. 10 is a cross-sectional view taken along a line III-III' of FIG. 9.

FIG. 9 is a layout of a portion of the stage circuit illustrated in FIG. 5 according to another embodiment of the invention. FIG. 10 is a cross-sectional view taken along a line III-III' of FIG. 9.

Structures of contact holes in a layout illustrated in FIG. 9 may be different from those of the contact holes in the layout illustrated in FIG. 6. Other components of the layout of FIG. 9 may be substantially the same as corresponding components of the layout of FIG. 6. Thus, in the present embodiment of FIG. 9, the structures of the contact holes will be mainly described and the descriptions to the other components will be omitted or mentioned briefly.

Referring to FIGS. 9 and 10, the first branch electrode GE1S and the second branch electrode CE1 may be electrically connected to each other via the first connection electrode CN1, disposed on the third insulating layer 30, through a first contact hole CH11 and a second contact hole CH12.

In an embodiment, the first contact hole CH11 may include a first sub-contact hole CH11a exposing a first portion of the first branch electrode GE1S and a second sub-contact hole CH11b exposing a second portion of the first branch electrode GE1S. The second portion of the first branch electrode GE1S is spaced apart from the first portion of the first branch electrode GE1S. The second contact hole CH12 may include a third sub-contact hole CH12a exposing a first portion of the second branch electrode CE1 and a fourth sub-contact hole CH12b exposing a second portion of the second branch electrode CE1. The second portion of the second branch electrode CE1 is spaced apart from the first portion of the second branch electrode CE1.

As illustrated in FIG. 10, the first connection electrode CN1 may be disposed on the third insulating layer 30 and may extend into the first sub-contact hole CH11a and the third sub-contact hole CH12a to electrically connect the first and second branch electrodes GE1S and CE1 to each other. In addition, the first connection electrode CN1 may further extend into the second sub-contact hole CH11b and the fourth sub-contact hole CH12b to electrically connect the first and second branch electrodes GE1S and CE1 to each other.

According to the present embodiment, the electrical connection between the first and second branch electrodes GE1S and CE1 may be more improved. As a result, it may be easy to electrically connect the first and second transistors TR1 and TR3 to each other.

In addition, the third branch electrode GE3S and the fourth branch electrode CE3 may be electrically connected to each other through a third contact hole CH21 and a fourth contact hole CH22. The third contact hole CH21 may include a fifth sub-contact hole CH21a exposing a first portion of the third branch electrode GE3S and a sixth sub-contact hole CH21b exposing a second portion of the third branch electrode GE3S. The second portion of the third branch electrode GE3S is spaced apart from the first portion of the third branch electrode GE3S. The fourth contact hole CH22 may include a seventh sub-contact hole CH22a exposing a first portion of the fourth branch electrode CE3 and an eighth sub-contact hole CH22b exposing a second portion of the fourth branch electrode CE3. The second portion of the fourth branch electrode CE3 is spaced apart from the first portion of the fourth branch electrode CE3.

According to the present embodiment, the electrical connection between the third and fourth branch electrodes GE3S and CE3 may be more improved. As a result, it may be easy to electrically connect the control electrode GE3 of the second transistor TR3 to the input terminal IN.

According to embodiments of the invention, the first and second transistors may overlap with the non-display area, and the first branch electrode connected to the first transistor may overlap with the second branch electrode which is connected to the second transistor and is disposed on a layer different from a layer on which the first branch electrode is disposed. Thus, it is possible to inhibit or prevent the blue light of the light source from passing between the first and second branch electrodes.

As a result, driving reliability of the display device according to the invention may be improved.

While the invention has been described with reference to example embodiments, it will be apparent to those skilled in the art that various changes and modifications may be made without departing from the spirits and scopes of the invention. Therefore, it should be understood that the above embodiments are not limiting, but illustrative. Thus, the scopes of the invention are to be determined by the broadest permissible interpretation of the following claims and their equivalents, and shall not be restricted or limited by the foregoing description.

What is claimed is:

1. A display panel comprising:
   a first display substrate comprising: a non-display area in which a driving circuit and a light shielding layer are disposed; and a display area in which a pixel electrode connected to the driving circuit is disposed;
   a second display substrate facing the first display substrate; and
   a liquid crystal layer disposed between the first display substrate and the second display substrate,
   wherein the driving circuit comprises: a first transistor; a second transistor; a first branch electrode connected to the first transistor and disposed on a first layer; a second branch electrode connected to the second transistor and disposed on a second layer, the second branch electrode overlapping with the first branch electrode in a direction parallel to a surface of the first display substrate; and a connection electrode connecting the first and second branch electrodes disposed on different layers from each other,
   wherein the light shielding layer overlaps with the first and second transistors and exposes the first and second branch electrodes.

2. The display panel of claim 1, wherein the light shielding layer covers a portion of each of the first and second branch electrodes.

3. The display panel of claim 1, wherein the first branch electrode is electrically connected to a control electrode of the first transistor, and the second branch electrode is electrically connected to one of an input electrode and an output electrode of the second transistor, the input and output electrodes being disposed on a layer different from a layer on which the control electrode of the first transistor is disposed.

4. The display panel of claim 1, wherein the light shielding layer has a red color.

5. The display panel of claim 1, wherein the first display substrate comprises:
- a base substrate on which the first branch electrode is disposed;
- a first insulating layer covering the first branch electrode and disposed on the base substrate;
- a second insulating layer covering the second branch electrode and disposed on the first insulating layer; and
- a third insulating layer disposed on the second insulating layer, wherein the third insulating layer comprises: a first contact hole exposing a portion of the first branch electrode; and a second contact hole exposing a portion of the second branch electrode,
- wherein the connection electrode is disposed on the third insulating layer and extends into the first and second contact holes.

6. The display panel of claim 5, wherein the light shielding layer is disposed on the second insulating layer to expose the first branch electrode and the second branch electrode.

7. The display panel of claim 5, wherein the light shielding layer is disposed on the third insulating layer to expose the first branch electrode and the second branch electrode.

8. The display panel of claim 7, wherein the light shielding layer covers the connection electrode to overlap with a portion of each of the first and second branch electrodes.

9. The display panel of claim 5, wherein the connection electrode electrically connects the portion of the first branch electrode to the portion of the second branch electrode through the first and second contact holes.

10. The display panel of claim 5, wherein the first contact hole comprises: a first sub-contact hole exposing a first portion of the first branch electrode; and a second sub-contact hole exposing a second portion, spaced apart from the first portion of the first branch electrode, and
- wherein the second contact hole comprises: a third sub-contact hole exposing a first portion of the second branch electrode; and a fourth sub-contact hole exposing a second portion, spaced apart from the first portion of the second branch electrode.

11. A display device comprising:
- a display panel comprising: a first display substrate; a second display substrate facing the first display substrate; and a liquid crystal layer disposed between the first display substrate and the second display substrate, wherein the first display substrate comprises: a driving circuit and a light shielding layer overlapping with a non-display area; and a pixel electrode connected to the driving circuit and overlapping with a display area, and wherein the second display substrate comprises: a color conversion layer having a first illuminant that absorbs first color light to emit second color light having a color that is different from the color of the first color light; and
- a light source configured to output the first color light to the display panel,
- wherein the driving circuit comprises: a first transistor; a second transistor; a first branch electrode connected to the first transistor and disposed on a first layer; a second branch electrode connected to the second transistor and disposed on a second layer, the second branch electrode overlapping with the first branch electrode in a direction parallel to a surface of the first display substrate; and a connection electrode connecting the first and second branch electrodes disposed on different layers from each other,
- wherein the light shielding layer covers the first and second transistors and exposes the first and second branch electrodes.

12. The display device of claim 11, wherein the color conversion layer comprises:
- a conversion part overlapping with the display area and including the first illuminant; and
- a dummy conversion part overlapping with the non-display area.

13. The display device of claim 12, wherein the conversion part further includes: a second illuminant that absorbs the first color light to emit third color light having a color that is different from the color of the second color light.

14. The display device of claim 13, wherein the dummy conversion part includes at least one of the first illuminant and the second illuminant.

15. The display device of claim 13, wherein the conversion part comprises:
- a first conversion part including the first illuminant;
- a second conversion part including the second illuminant; and
- a third conversion part transmitting the first color light.

16. The display device of claim 15, wherein the first, second and third conversion parts are spaced apart from each other in a direction parallel to a surface of the second display substrate, and
- wherein the color conversion layer further comprises: a black matrix disposed between the first to third conversion parts spaced apart from each other.

17. The display device of claim 11, wherein the first color light is blue light.

18. The display device of claim 11, wherein the second display substrate further comprises: an in-cell polarizing layer that includes a wire grid pattern disposed between the liquid crystal layer and the color conversion layer and overlapping with the display area and the non-display area.

19. The display device of claim 11, wherein the first branch electrode is electrically connected to a control electrode of the first transistor, and
- wherein the second branch electrode is electrically connected to an input electrode of the second transistor, the input electrode of the second transistor being disposed on a layer different from a layer on which the control electrode of the first transistor is disposed.

20. The display device of claim 11, wherein the first branch electrode is electrically connected to a control electrode of the first transistor, and
- wherein the second branch electrode is electrically connected to a control electrode of the second transistor, the control electrode of the second transistor being disposed on a layer different from a layer on which the control electrode of the first transistor is disposed.

* * * * *